US00RE45207E

(19) United States
(12) Reissued Patent
Takehara et al.

(10) Patent Number: US RE45,207 E
(45) Date of Reissued Patent: Oct. 28, 2014

(54) SHEET TREATING APPARATUS AND IMAGE FORMING APPARATUS THEREWITH

(71) Applicant: Canon Kabushiki Kaisha, Tokyo (JP)

(72) Inventors: Yoshifumi Takehara, Abiko (JP); Kenichi Hayashi, Kashiwa (JP)

(73) Assignee: Canon Kabushiki Kaisha, Tokyo (JP)

(21) Appl. No.: 13/666,388

(22) Filed: Nov. 1, 2012

Related U.S. Patent Documents

Reissue of:
(64) Patent No.: 6,290,220
Issued: Sep. 18, 2001
Appl. No.: 09/313,737
Filed: May 18, 1999

(30) Foreign Application Priority Data

May 20, 1998 (JP) ..... 10-138952

(51) Int. Cl.
*B65H 39/00* (2006.01)
*B65H 37/04* (2006.01)

(52) U.S. Cl.
USPC ..... 270/58.12; 270/58.08; 270/58.27; 399/404; 399/410

(58) Field of Classification Search
USPC ..... 271/221, 223; 270/58.07, 58.08, 58.11, 270/58.12, 58.13, 58.14, 58.15, 58.16, 270/58.19, 58.18, 58.27; 399/404, 408, 410
See application file for complete search history.

(56) References Cited

U.S. PATENT DOCUMENTS 4,073,391 A * 2/1978 O'Brien et al. ..... 414/789
5,263,697 A 11/1993 Yamazaki et al.
5,288,062 A 2/1994 Rizzolo et al.
5,384,634 A 1/1995 Takehara et al.
5,513,839 A * 5/1996 Green ..... 270/58.07
5,556,251 A 9/1996 Hiroi et al.
5,573,233 A 11/1996 Hirai et al.
5,580,039 A 12/1996 Takehara et al.
5,618,035 A 4/1997 Coombs et al.
5,622,359 A * 4/1997 Kawano et al. ..... 270/58.12
5,639,078 A * 6/1997 Mandel et al. ..... 270/58.12
5,762,328 A * 6/1998 Yamada et al. ..... 270/58.08

(Continued)

FOREIGN PATENT DOCUMENTS

EP 0346851 12/1989
EP 0850866 7/1998
JP 10109809 A * 4/1998

*Primary Examiner* — Patrick Mackey
(74) *Attorney, Agent, or Firm* — Fitzpatrick, Cella, Harper & Scinto

(57) ABSTRACT

A sheet treating apparatus including a sheet discharging device for discharging a sheet, a first stacking tray for receiving the sheets discharged by the sheet discharging device, an aligning device for aligning a sheet bundle on the first stacking tray by a pinching movement effected by a first and second aligning members shiftable independently in a direction perpendicular to a sheet discharging direction, and a transferring device for transferring the sheet bundle on the first stacking tray to a second stacking tray, wherein, in the first stacking tray, alignment positions of the respective sheet bundles are offset by shifting the alignment positions by a predetermined amount to first and second aligning positions alternately by the first and second aligning members, and wherein the first and second aligning positions of the first stacking tray are opposite directions transverse to the sheet discharging direction with respect to the position of the sheet discharged.

13 Claims, 20 Drawing Sheets

(56) References Cited

U.S. PATENT DOCUMENTS 5,772,198 A * 6/1998 Yamamoto ..... 270/58.12
5,857,670 A 1/1999 Jung
5,895,036 A 4/1999 Asao
5,897,250 A 4/1999 Hirai et al.
6,042,098 A 3/2000 Kubota et al.
6,102,385 A 8/2000 Wakamatsu et al.
6,179,287 B1 * 1/2001 Watanabe et al. ..... 271/215
6,231,039 B1 * 5/2001 Chung ..... 270/58.01

* cited by examiner

SHEET TREATING APPARATUS AND IMAGE FORMING APPARATUS THEREWITH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a sheet treating apparatus, and more particularly, it relates to a sheet treating apparatus used with an image forming apparatus such as a copying machine, a laser beam printer and the like and having a first treating means (referred to as "treating tray" hereinafter) for effecting treatment such as stapling or sorting sheets discharged from the image forming apparatus and a second treating means (referred to as "stack tray" hereinafter).

2. Related Background Art

In the past, various techniques regarding a combination of a treating tray for stapling a sheet bundle if desired and a stack tray for receiving each sheet bundle and for containing the sheet bundle have been proposed as disclosed in Japanese Patent Application Laid-open No. 2-144370.FIG. 27 is a sectional view showing an example of such a technique.

In FIG. 27, the reference numeral 501 denotes a treating tray; and 502 denotes a stack tray. Around the treating tray 501, there are provided a stapler 503 for effecting stapling, and a jogger 504 for effecting alignment of sheets while shifting frontward and rearward.

With the above-mentioned arrangement, a sheet bundle aligned on the treating tray (staple tray) and stapled, is discharged onto the stack tray 502 by a pair of bundle discharge rollers 505, 506. In order to sort the sheet bundles discharged onto the stack tray 502, the stack tray 502 can be shifted frontward and rearward (in a direction of the width of the sheet) for each sheet bundle and can be shifted upward and downward to align the surface of the sheet bundle with the bundle discharge roller pair, so that the stack tray 502 is lowered while sorting the sheets frontward and rearward.

Both the treating tray 501 and the stack tray 502 are inclined so that downstream (left) ends thereof are located higher than upstream ends thereof, and trailing ends of the sheets on the stack tray 502 are regulated by a rear end wall 507.

Incidentally, the reference numerals used in the conventional technique shown in FIG. 27 do not relate to the reference numerals used in the present invention.

However, in the above-mentioned conventional technique, as the sheet bundles are successively discharged, when a larger number of sheets (about 1000 sheets or more) are stacked on the stack tray 502, lower sheets are contacted with the rear end wall 507 with great pressure due to the weight of the upper sheets. In this condition, when the stack tray 502 tries to be shifted frontward and rearward, rear ends of the lower sheets will be damaged or folded by significantly rubbing against the rear end wall 507.

Also, as the stack tray 502 has to be shifted frontward and rearward while resting a large number of sheets thereon, a large motor is required for shifting the stack tray 502 and a secure shifting mechanism is required.

Further, when the stack tray 502 is shifted in a condition that non-stapled sheets are stacked on the tray, if the stacking condition is unstable due to curl in the sheets or the like, the shifting movement of the tray may cause misalignment of the sheets.

SUMMARY OF THE INVENTION

The present invention aimns to eliminate the above-mentioned conventional drawbacks, and an object of the present invention is to provide a sheet treating apparatus including, sheet discharging means for discharging a sheet, first stacking means for receiving the sheets discharged by the sheet discharging means, aligning means for aligning a sheet bundle on the first stacking means by a pinching movement effected by a first and a second aligning members shiftable independently in a direction perpendicular to a sheet discharging direction, transferring means for transferring the sheet bundle on the first stacking means to second stacking means, and wherein, in the first stacking means, alignment positions of the respective sheet bundles are offset by shifting the aligning positions by a predetermined amount to first and second aligning positions alternately by means of the first and second aligning members, and further wherein the first and second aligning positions of the first stacking means are opposite directions transverse to the sheet discharging direction with respect to the position of the sheet discharged.

The sheet treating apparatus may include a plurality of driving means for driving the first and second aligning members independently, and controlling means for controlling the driving means, and wherein the sheet bundle may be aligned by using a reference position obtained by shifting one of the first and second aligning members by a predetermined amount with respect to an end of the sheet discharged, and then the next sheet bundle may be aligned by using a reference position obtained by shifting the other aligning member by a predetermined amount from the other end of the sheet, and such sheet bundle aligning operations may be effected alternately for successive sheet bundles.

With the arrangement as mentioned above, the sheets discharged on the first stacking means are aligned by the first and second aligning members shiftable independently, and the alignment positions of the first and second aligning members are alternately shifted by the predetermined amount frontward forwardly and rearward in the direction perpendicular to the sheet discharging direction whenever the sheet bundle is aligned on the first stacking means. On the second stacking means to which the sheet bundle aligned on the first stacking means is transferred by the transferring means, the sheet bundles are stacked in the alternately offset condition, thereby eliminating an offset operation of the second stacking means for offsetting the sheet bundles.

As mentioned above, according to the present invention, since the sheet bundle transferred from the first stacking means to the second stacking means is previously offset, the sheet offsetting in the second stacking means can be eliminated or omitted, and thus, the trailing end(s) of the sheet(s) can be prevented from being damaged or(and) folded by rubbing the trailing end against the second stacking means when the sheets are offset on the second stacking means, and a driving source for the second stacking means can be made compact.

Further, when the offsetting operation is effected, since the sheet shifting amount on the first stacking means is minimized to ensure the required maximum offset amount for each sheet bundle, a driving means for shifting the aligning members can be made compact and the sheet can be discharged even from a high speed image forming apparatus.

DESCRIPTION OF THE PREFERRED EMBODIMENTS

Figure 26:
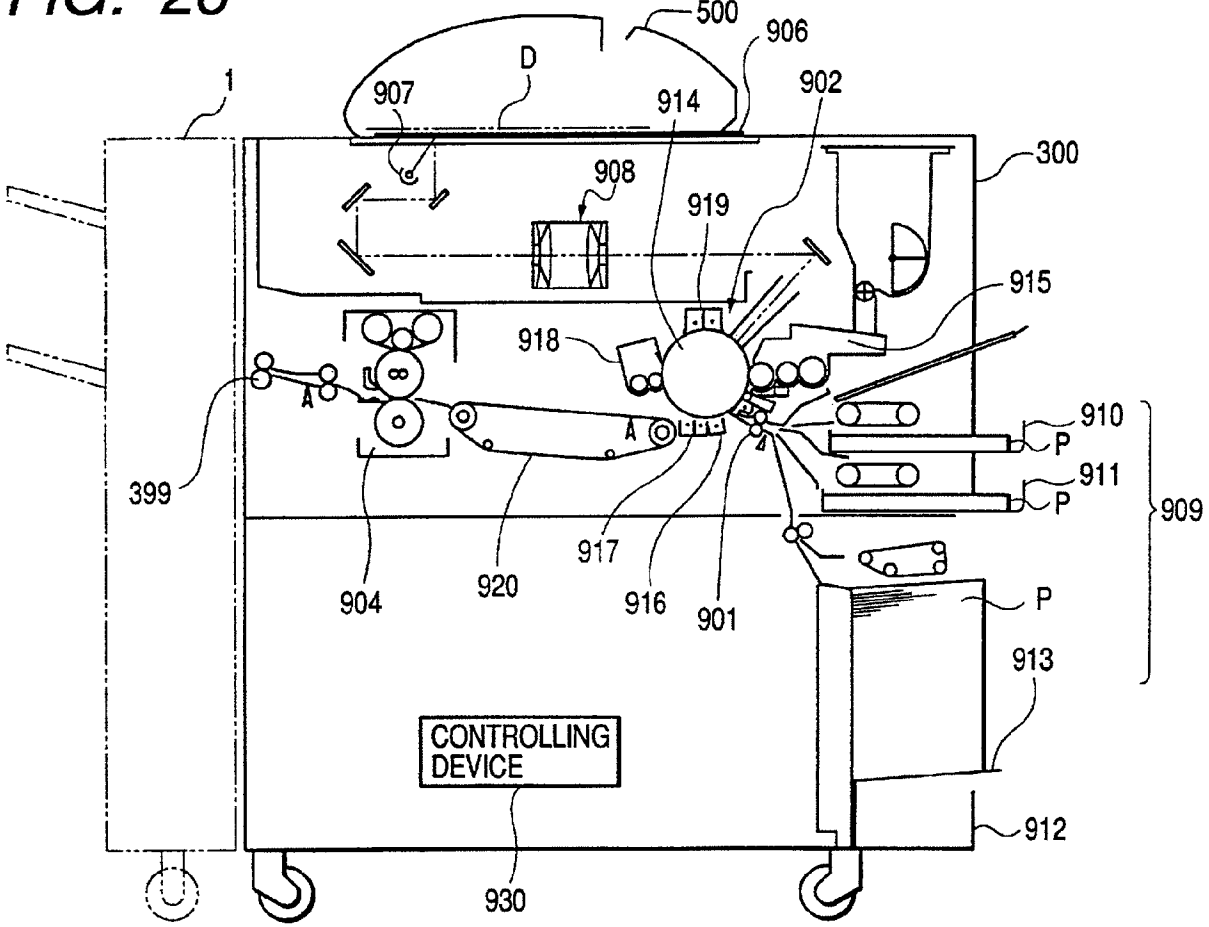
FIG. 26 is a front view of an image forming apparatus to which the sheet treating apparatus according to the present invention can be applied.
Figure 27:
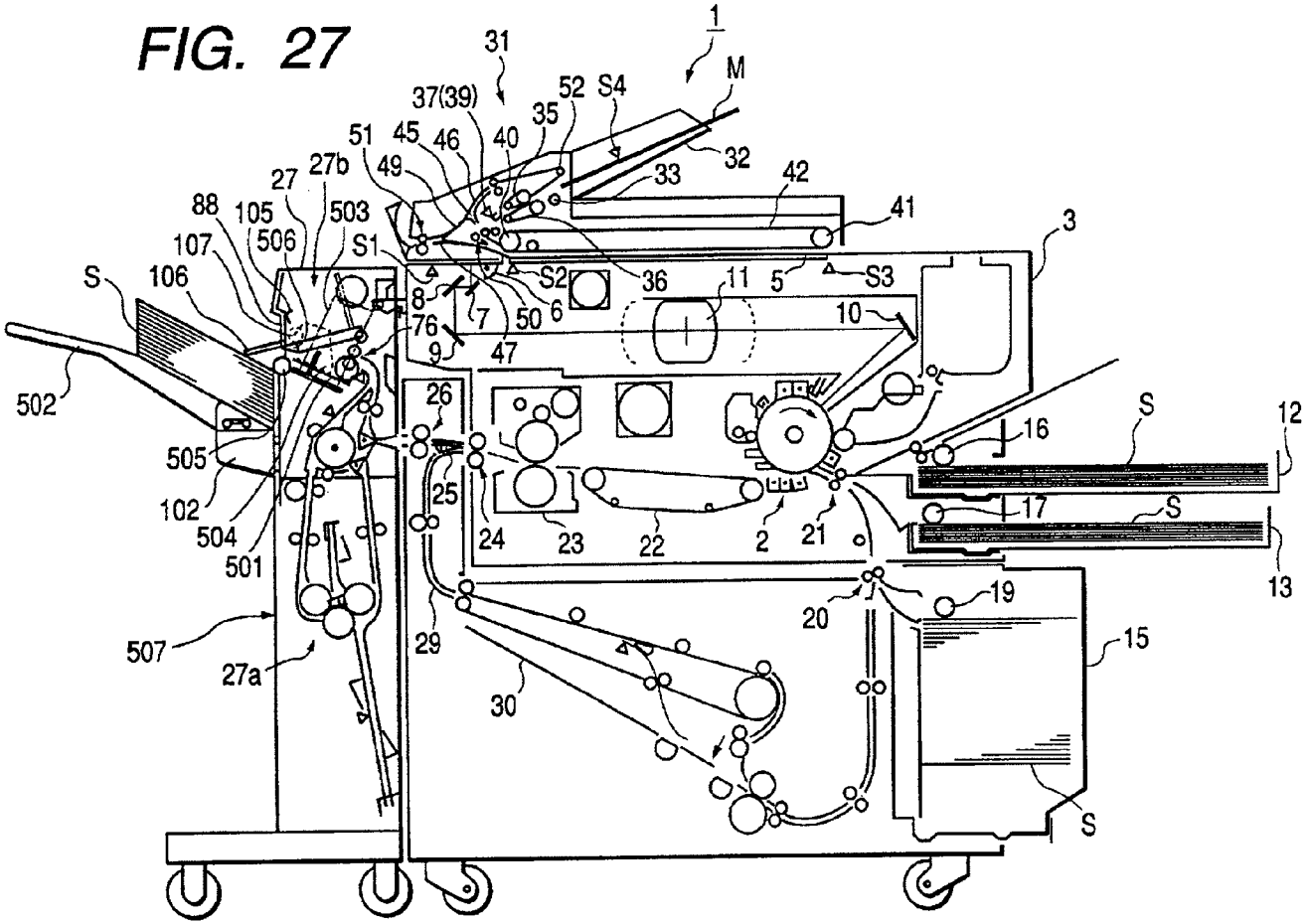
FIG. 27 is an elevational sectional view of a conventional sheet treating apparatus and an image forming apparatus having such a sheet treating apparatus.

FIG. 26 shows an example of an image forming apparatus (copying machine) having a sheet treating apparatus according to the present invention.

The image forming apparatus (copying machine) 300 includes a platen glass plate (as an original stocking plate) 906, a light source 907, a lens system 908, a sheet feeding (supplying) portion 909, an image forming portion 902, an automatic original feeding device 500 for feeding an original to the platen glass plate 906, and a sheet treating apparatus 1 for stacking sheets (discharged from the copying machine) on which images are formed.

The sheet feeding portion 909 includes cassettes 910, 911 detachably mounted to the image forming apparatus 300 and adapted to contain recording sheets P, and a deck 913 disposed on a pedestal 912. The image forming portion (image forming means) 902 includes a cylindrical photosensitive drum 914 around which there are disposed a developing device 915, a transfer charger 916, a separation charger 917, a cleaner 918 and a primary charger 919. At a downstream side of the image forming portion 902, there are provided a conveying device 920, a fixing device 904 and a pair of discharge rollers (discharging means) 399.

Next, an operation of the image forming apparatus 300 will be described.

When a sheet feeding signal is outputted from a controlling device 930 of the image forming apparatus 300, the sheet P is fed or supplied from the cassette 910 or 911 or the deck 913. On the other hand, light emitted from a light source 907 is illuminated on an original D rested on the original stocking plate 906. Light reflected from the original D is incident on the photosensitive drum 914 through the lens system 908. The photosensitive drum 914 is previously charged by the primary charger 919. When the light is illuminated on the photosensitive drum, an electrostatic latent image is formed on the drum, and then, the electrostatic latent image is developed by the developing device 915 to form a toner image.

The sheet P fed from the sheet feeding portion 909 is conveyed to a pair of registration rollers 901, where skew-feed of the sheet is corrected. Then, the sheet is sent to the image forming portion 902 in exact timing. In the image forming portion 902, the toner image on the photosensitive drum 914 is transferred onto the fed sheet P by the transfer charger 916, and the sheet P to which the toner image is transferred is charged by the separation charger 917 with polarity opposite to polarity of the transfer charger 916, thereby separating the sheet from the photosensitive drum 914.

The separated sheet P is conveyed, by the conveying device 920, to the fixing device 904, where the toner image is permanently fixed to the sheet P. Thereafter, the sheet P is discharged out of the image forming apparatus 300 by the pair of discharge rollers 399.

In this way, the image is formed on the sheet P fed from the sheet feeding portion 909, and then, the sheet is discharged into the sheet treating apparatus 1 according to the present invention.

Next, an embodiment of the present invention will be explained with reference to the accompanying drawings.

Figure 1:
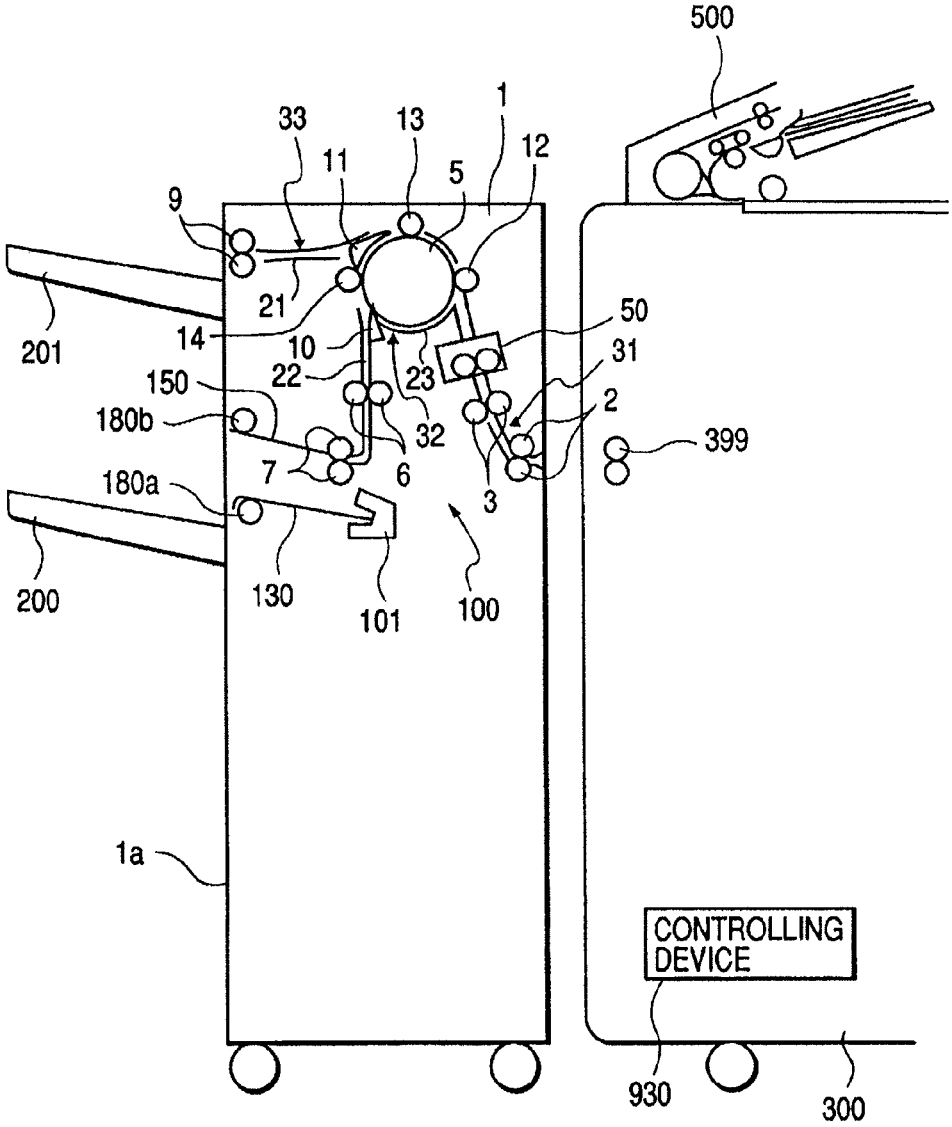
FIG. 1 is a schematic elevational view of an entire sheet treating apparatus according to the present invention.

In FIG. 1, the image forming apparatus 300 is associated with a finisher (sheet treating apparatus) 1. Detailed explanation of the image forming apparatus 300 and the RDF (automatic original feeding device) 500 will be omitted here. The finisher 1 includes a pair of inlet rollers 2, a pair of conveying rollers 3, a sheet detecting sensor 31, a punch unit 50 for forming holes in the conveyed sheet in the vicinity of a trailing end thereof, and a conveying large roller 5 associated with push-down rollers 12, 13, 14 to pinch the sheet therebetween.

A switching flapper 11 serves to switch a non-sort path 21 and a sort path 22. A switching flapper 10 serves to switch the sort path 22 and a buffer path 23 for temporarily storing the sheet. The finisher further includes a pair of conveying rollers 6, an intermediate tray (referred to as "treating tray" hereinafter) 130 for temporarily stacking the sheets and for effecting alignment and stapling of the sheets, a pair of discharge rollers 7 for discharging the sheet onto the treating tray (first stacking tray) 130, a rocking guide 150, and a bundle discharging roller (transferring means) 180b supported by the rocking guide 150 and adapted to cooperate with a roller (transferring means) 180a provided in connection with the treating tray 130 to bundle-convey the sheets on the treating tray 130 thereby to bundle-discharge the sheets onto the stack tray (second stacking means) 200 when the rocking guide 150 is shifted to a closed position.

Figure 2:
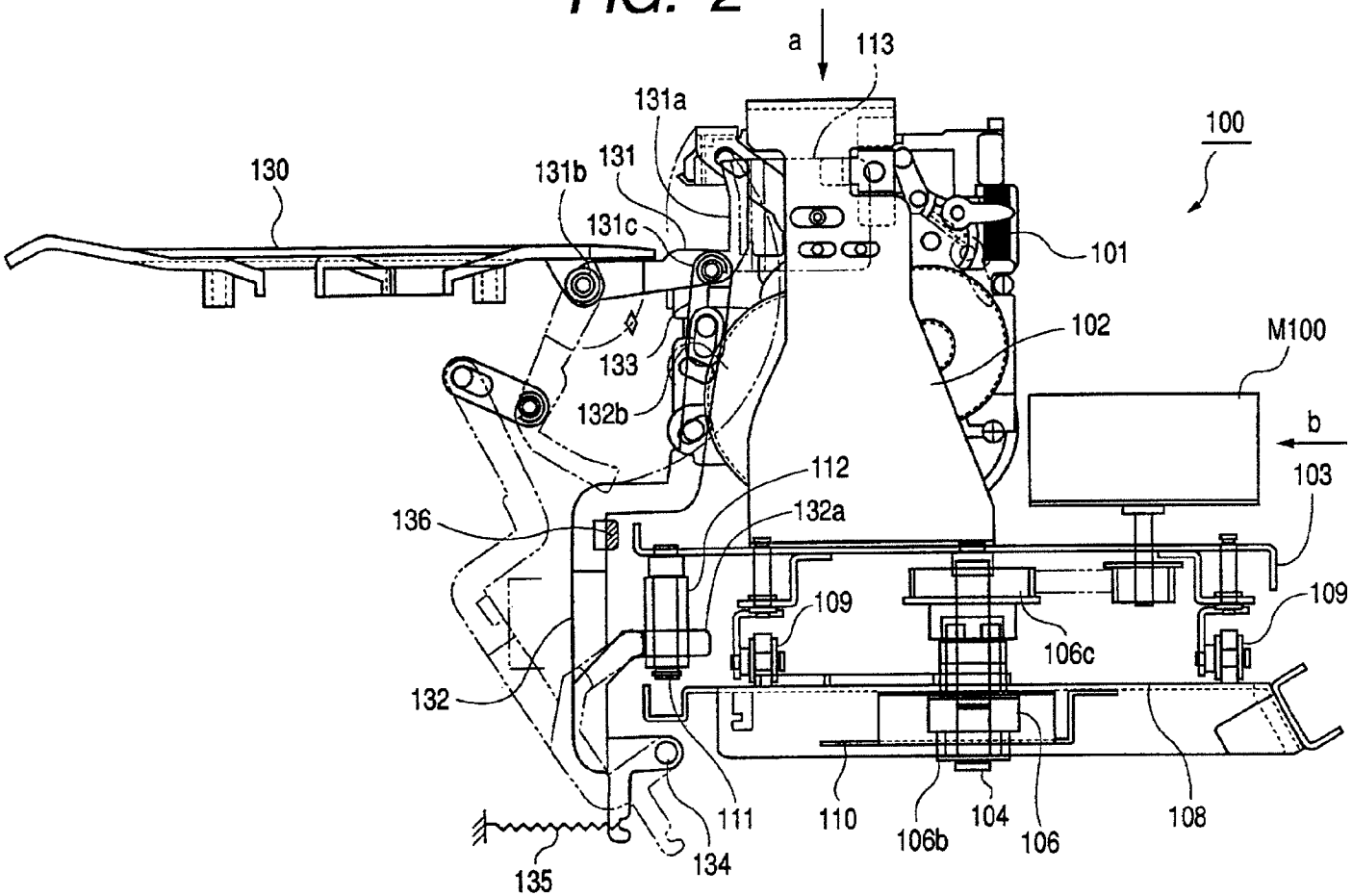
FIG. 2 is a front view showing a stapler and a treating tray trailing end stopper rotating portion.
Figure 3:
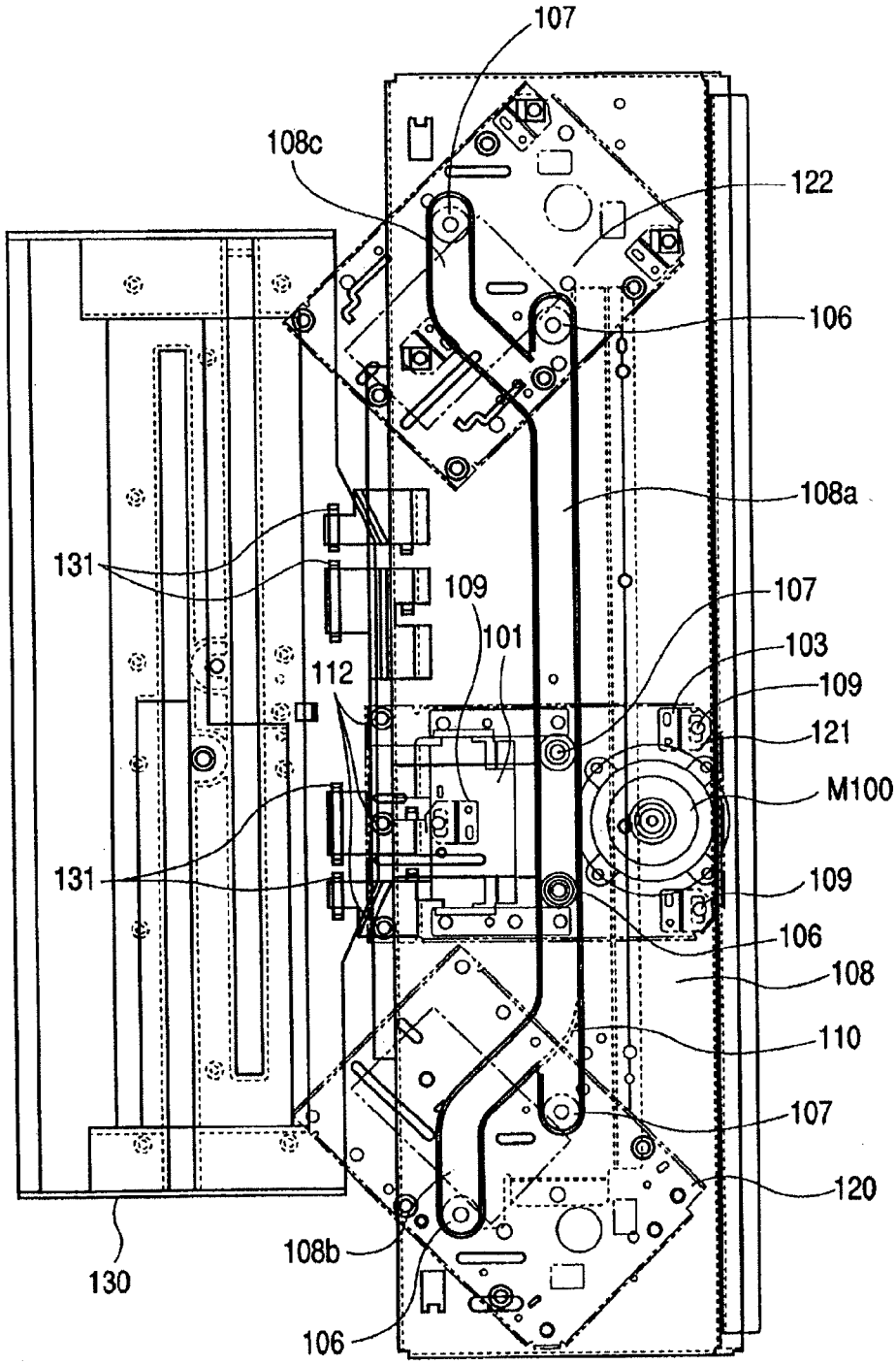
FIG. 3 is a plan view of a stapler shifting mechanism.
Figure 4:
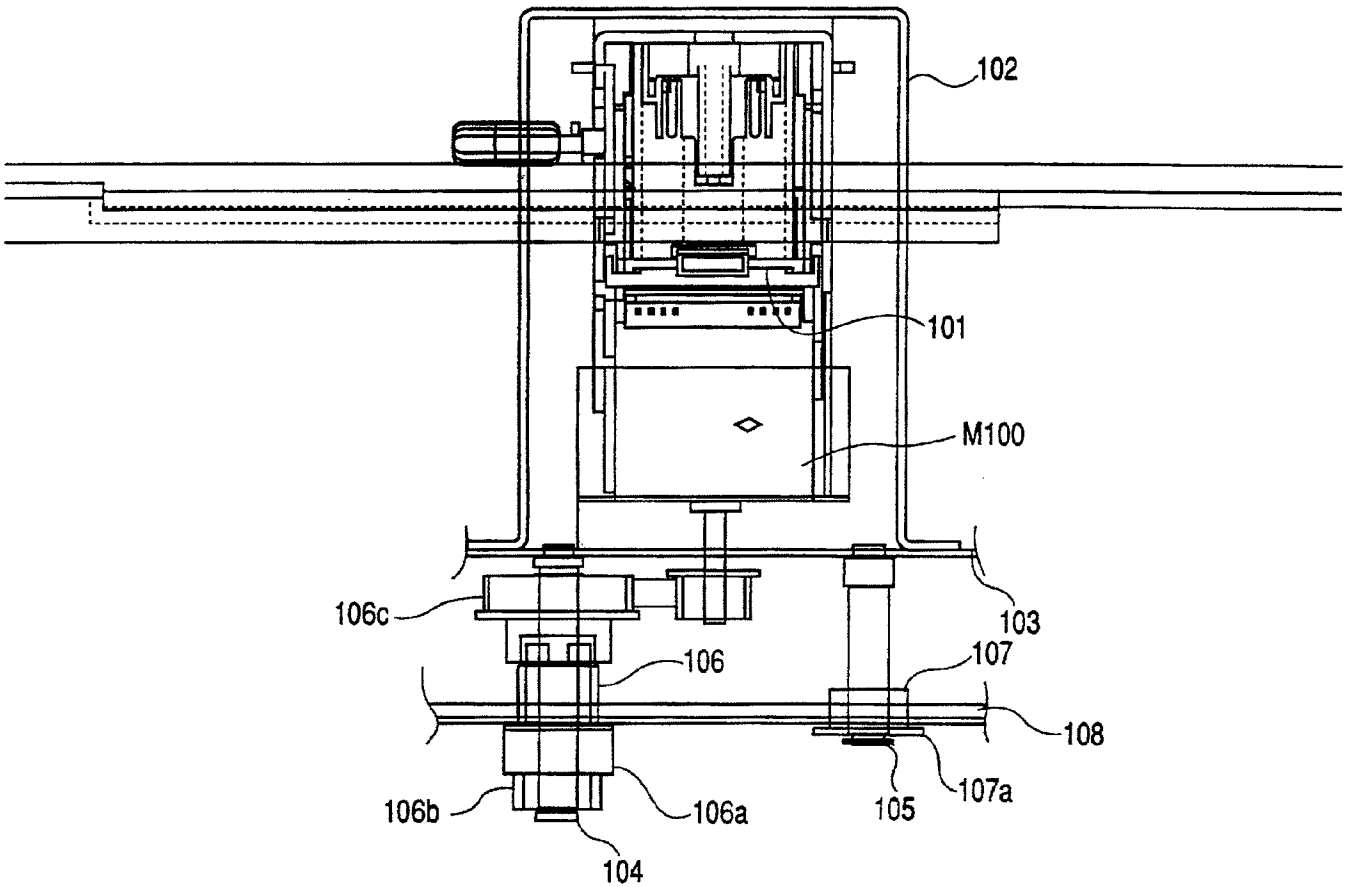
FIG. 4 is a right side view of the stapler of FIG. 3.

Next, the staple unit 100 will be explained with reference to FIGS. 2 to 4. FIG. 2 is a front view, FIG. 3 is a plan view looked at from a direction shown by the arrow a in FIG. 2, and FIG. 4 is a side view looked at from a direction shown by the arrow b in FIG. 2.

A stapler (stapling means) 101 is secured to a shifting table 103 via a holder 102. Sub-rollers 106, 107 are rotatably mounted on shafts 104, 105 secured to the shifting table 103, and the sub-rollers 106, 107 are fitted into a rail slot (108a, 108b, 108c) formed in a fixed plate 108.

The sub-rollers 106, 107 have flanges 106a, 107a having dimensions greater than the rail slot, and three supporting sub-rollers are provided at a lower part of the shifting table 103, so that the shifting table 103 supporting the stapler 101 can be shifted on the fixed plate 108 along the rail slot without disengaging from the fixed plate. The shifting table 103 is shifted on the fixed plate 108 via rotatable sub-rollers 109 provided on the shiftable table.

The rail slot (108a, 108b, 108c) is branched at front and rear parts to define two parallel rail portions. With this configuration of the railslot, when the stapler 101 is positioned at a front side, the sub-roller 106 is fitted into the rail slot portion 108b and the sub-roller 107 is fitted into the rail slot portion 108a, thereby inclining the stapler 101. When the stapler 101 is located at a central position, both the sub-rollers 106 and 107 are fitted into the rail slot portion 108a, thereby maintaining the stapler 101 in a horizontal condition.

When the stapler 101 is positioned at a rear side, the sub-roller 106 is fitted into the rail slot portion 108a and the sub-roller 107 is fitted into the rail slot portion 108c, thereby inclining the stapler 101 in a opposite direction in comparison with the inclination of the stapler 101 at the front side.

After the sub-rollers 106, 107 are fitted into the parallel rail slot portions, the stapler 101 is shifted while maintaining its inclined posture. A timing for changing the posture of the stapler 101 is controlled by cams (not shown).

Next, a shifting mechanism for the stapler 101 will be explained.

The sub-roller 106 of the shifting table 103 is integrally formed with a pinion gear 106b and a belt pulley 106c, and the pinion gear 106b is connected to a motor M100 secured to an upper portion of the shifting table via a belt mounted on the pulley 106c. A rack gear 110 for engaging with the pinion gear 106b is secured to a lower surface of the fixed plate along the rail slot, so that the shifting table 103 is shifted together with the stapler 101 frontward and rearward by forward and reverse rotations of the motor M100.

A stopper laying-down sub-roller 112 is mounted on a shaft 111 extending downwardly from the lower surface of the shifting table 103. This sub-roller (described later fully) serves to rotate a trailing end stopper 131 of the treating tray 130 in order to prevent interference between the trailing end stopper 131 and the stapler 101.

The stapler unit 100 is provided with a sensor for detecting a home position of the stapler 101. Normally, the stapler 101 is located at the home position (frontmost portion in the illustrated embodiment).

Next, the trailing end stopper 131 for supporting trailing ends of the sheets P stacked on the treating tray 130 will be described.

The trailing end stopper 131 has a surface perpendicular to the stacking surface of the treating tray 130 and is provided with a support surface 131a for supporting the trailing ends of the sheets, a pin 131b fitted into a circular hole of the treating tray 130 to rock the stopper, and a pin 131c fitted into a link (described later). The link includes a main link 132 having a cam surface 132a against which the sub-roller 112 attached to the stapler shifting table 103 abuts, and a connection link 133 for connecting a pin 132b provided on an upper end of the main link 132 to the pin 131c of the trailing end stopper 131.

The main link 132 can be rocked around a shaft 134 secured to a frame (not shown). A lower end of the main link 132 is connected to a tension spring 135 for biasing the main link 132 toward a clockwise direction. Since the main link 132 is positioned by an abutment plate 136, the trailing end stopper 131 normally has a posture perpendicular to the treating tray 130.

When the stapler shifting table 103 is shifted, the cam surface of the main link 132 connected to the stopper 131 which will interfere with the stapler 101 is laid down by the laying-down sub-roller 112 of the shifting table 103, with the result that the trailing end stopper 131 is pulled by the connection link 133 to be rotated to a retracted position where the stopper 131 does not interfere with the stapler 101. A plurality of laying-down sub-rollers 112 (three rollers in the illustrated embodiment) are provided so that the trailing end stopper 131 is maintained in the retracted position while the stapler 101 is being shifted.

The holder 102 for supporting the stapler 101 is provided at its both side surfaces with staple stoppers 113 (shown by the two dot and chain line) each of which has a support surface having the same configuration as the trailing end stopper 131, so that, even when the stapler 101 in the horizontal condition (central position) pushes the stopper 131, the trailing ends of the sheets can be supported by the staple stoppers 113.

Figure 5:
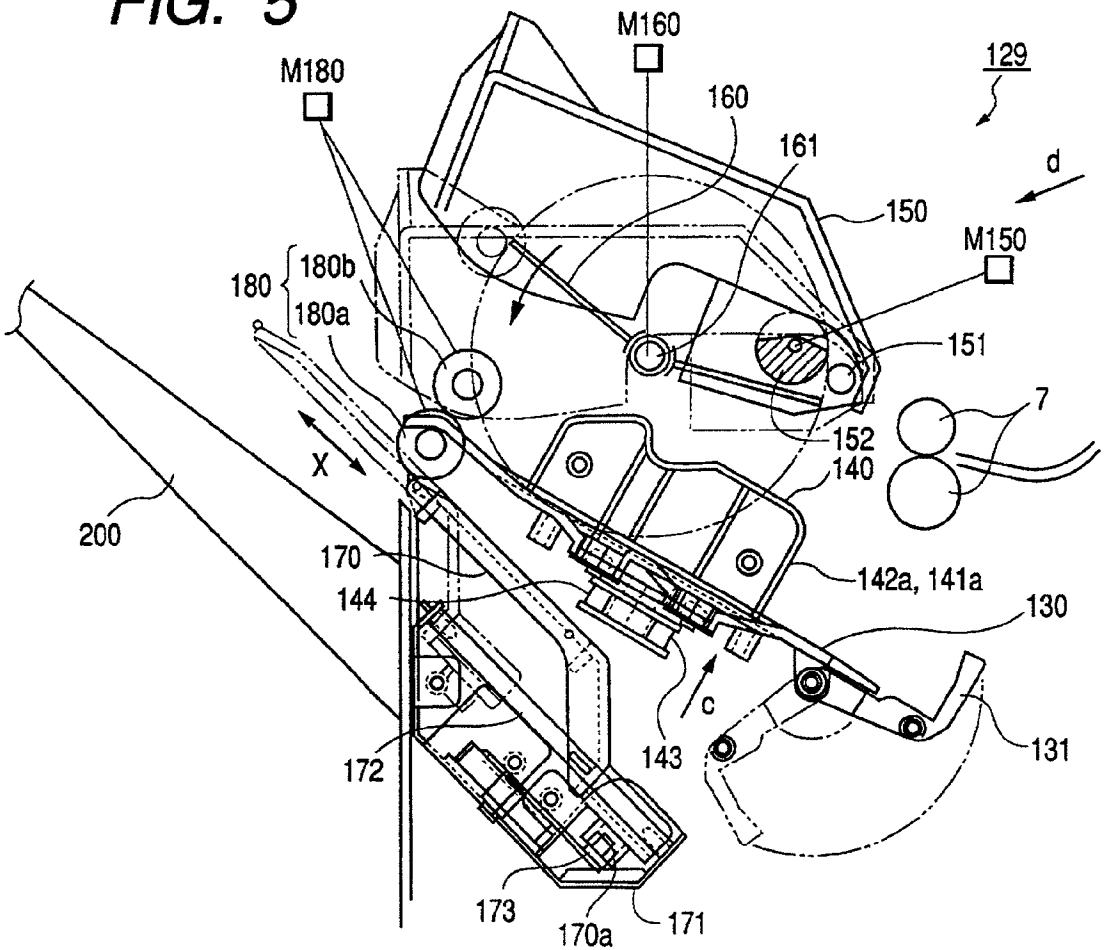
FIG. 5 is a front sectional view showing a rocking guide portion and a treating tray portion.

Next, the treating tray unit 129 will be explained (FIG. 5).

The treating tray unit 129 is disposed between the conveying portion for conveying the sheet from the image forming apparatus 300 and the stack tray 200 for receiving the sheet bundle treated on the treating tray 130.

The treating tray unit 129 is constituted by the treating tray 130, the trailing end stopper 131, aligning means 140, a rocking guide 150, a pull-in paddle 160, a retractable tray 170 and a pair of bundle discharge rollers 180.

The treating tray 130 is inclined so that the downstream end (left end) thereof is located higher than the upstream end (right end) thereof, and the trailing end stopper 131 is rotatably supported at the upstream end of the tray 130. The sheet P discharged by the pair of discharge rollers 7 of the conveying portion is slid on the treating tray 130 by its own weight and under the action of the paddle 160 (described later) until the trailing end of the sheet abuts against the trailing end stopper 131. The bundle discharge lower roller 180a is provided at the downstream end of the treating tray 130, and the bundle discharge upper roller 180b which can be engaged by the bundle discharge lower roller 180a is provided on the rocking guide 150 (described later). These rollers can be reversibly rotated by a motor M180.

Figure 6:
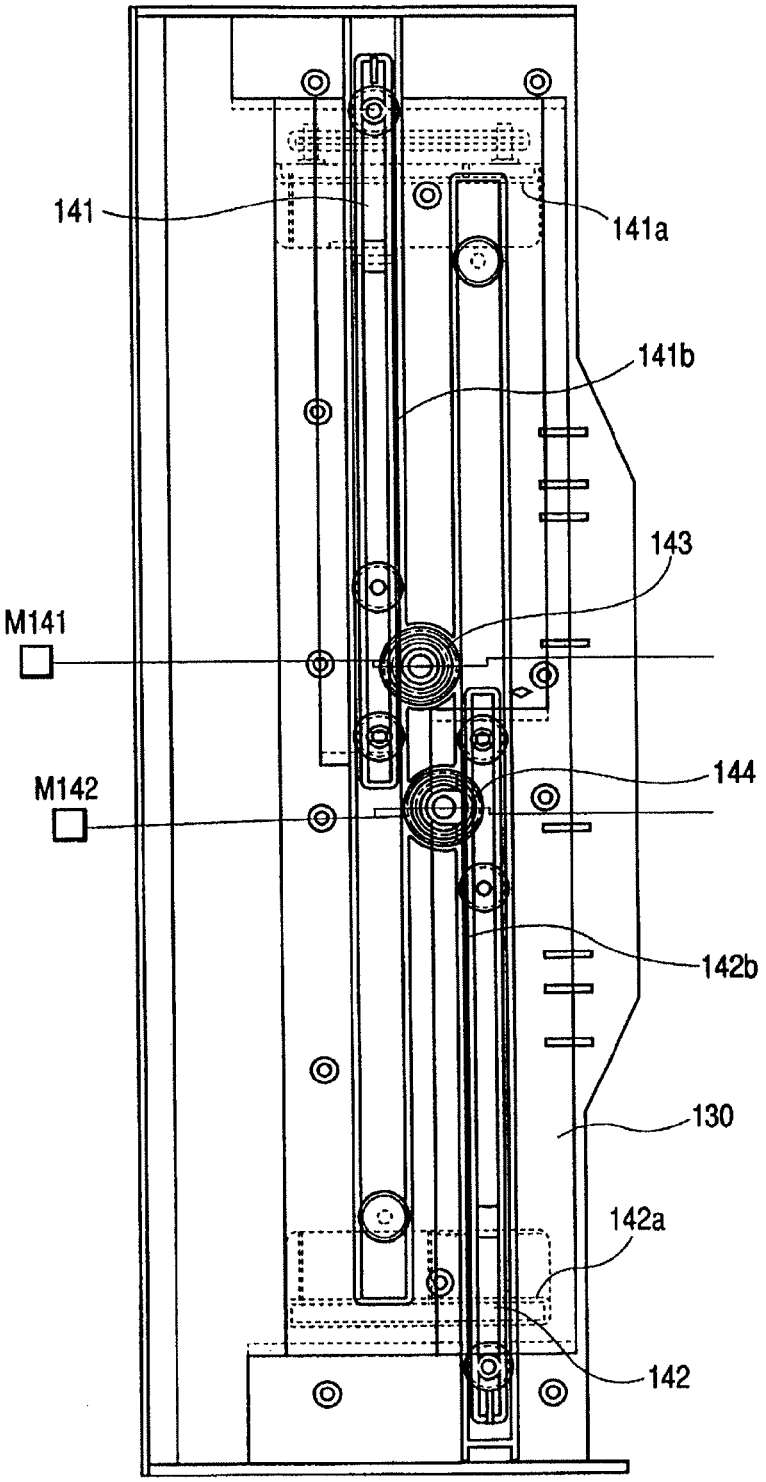
FIG. 6 is a plan view showing an aligning wall shifting mechanism for the treating tray.

Next, the aligning members (aligning means) 140 will be explained with reference to FIG. 6 which is a view showing the aligning means looked at from a direction shown by the arrow c in FIG. 5.

The aligning means 140 includes a front side aligning member 141 and a rear side aligning member 142 which can be shifted independently frontward and rearward. Both the front side aligning member (first aligning member) 141 and the rear side aligning member (second aligning member) 142 are upright from the treating tray 130 and have support surfaces (for supporting the lower surface of the sheet P) bent from alignment surfaces 141a, 142a (for urging lateral edges of the sheets) at a right angle, and gear portions 141b, 142b extending frontward and rearward in parallel with the treating tray 130 and having rack gears. The two aligning members 141, 142 are supported by guides extending frontward and rearward along the treating tray 130 so that the alignment surfaces 141a, 142a are protruded from the upper surface of the treating tray 130 and the gear portions 141b, 142b are protruded from the lower surface of the treating tray 130.

The rack gear portions 141b, 142b are engaged by pinion gears 143, 144, respectively, and the pinion gears 143, 144 are connected to motors M141, M142 via pulleys and belts, so that the aligning members 141, 142 can be shifted frontward and rearward reversibly by forward and reverse rotations of the motors M141, M142. The aligning members 141, 142 are provided with sensors (not shown) for detecting respective home positions. Normally, the aligning members 141, 142 are waiting at their home positions.

In the illustrated embodiment, the home position of the front side aligning member 141 is a frontmost portion and the home position of the rear side aligning member 142 is a rearmost portion.

The rocking guide 150 supports the bundle discharge upper roller 180b at its downstream end (left end) and is provided at its upstream (right) end with a rocking fulcrum shaft 151. When the sheets P are discharged onto the treating tray 130 one by one, the rocking guide 150 is normally in an open condition (that the pair of bundle discharge rollers 180 are spaced apart from each other) not to interfere with discharging and dropping operations of the sheet onto the treating tray 130 and the sheet aligning operation. When the sheet bundle is discharged from the treating tray 130 onto the stack tray 200, the rocking guide is shifted to a closed condition (that the pair of bundle discharge rollers 180 are engaged by each other).

A rotation cam 152 is provided at a position corresponding to a side plate of the rocking guide 150. When the rotation cam 152 is rotated to push the side plate of the guide 150 upwardly, the rocking guide 150 is rocked around the shaft 151 to be opened. From this condition, when the rotation cam 152 is rotated through 180 degrees to separate the cam from the side plate of the guide 150, the rocking guide 150 is closed. The rotation of the rotation cam 152 is effected by a motor M150 connected to the cam through a driving system (not shown).

A home position of the rocking guide 150 corresponds to the open condition, and there is provided a sensor (not shown) for detecting the home position.

Next, the pull-in paddle 160 will be described.

The pull-in paddle 160 is secured to a shaft 161 which is rotatably supported by front and rear plates. The shaft 161 is connected to a motor M160 so that, when the shaft receives a driving force from the motor M160, the shaft is rotated in an anti-clockwise direction. A length of the paddle 160 is selected to be slightly greater than a distance between the shaft 161 and the treating tray 130, and a home position of the paddle 160 is set to a position (shown by the solid line) where the paddle does not contact with the sheet P discharged onto the treating tray 130 by the pair of discharge rollers 7. In this condition, when the discharging of the sheet P is completed and the discharged sheet P is seated on the treating tray 130, the paddle 160 is rotated in the anti-clockwise direction by the motor M160 to pull the sheet P until the sheet abuts against the trailing end stopper 131. Thereafter, after a predetermined time period is elapsed, the paddle 160 is stopped at the home position for preparing for the next sheet discharging.

Figure 7:
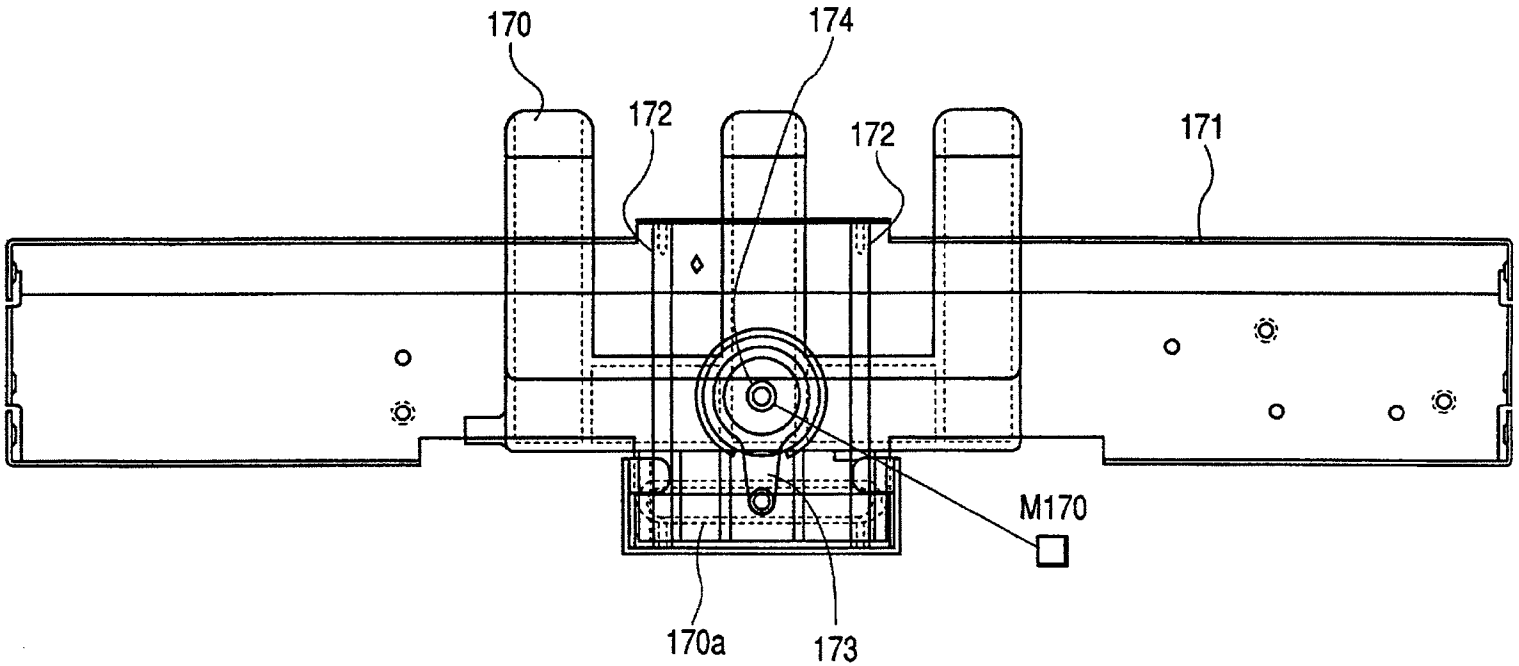
FIG. 7 is a plan view of a retractable tray portion.

Next, the retractable tray 170 will be described with reference to FIG. 7 which is a view looked at from a direction shown by the arrow d in FIG. 5.

The retractable tray 170 is disposed below the bundle discharge lower roller 180a and can be extended and retracted in a sheet conveying direction (x direction) while following substantially the inclination of the treating tray 130. In an extended condition, the retractable tray 170 extends toward the stack tray 200 and is overlapped therewith (as shown by the two dot and chain line in FIG. 5). In a retracted condition, a distal end of the retractable tray is retracted to the right of the pair of bundle discharge rollers 180 (as shown by the solid line in FIG. 5). It is selected so that the gravity center of the sheet P discharged on the treating tray 130 does not exceed the distal end position of the retractable tray 170 in the extended condition.

The retractable tray 170 is supported by a rail 172 secured to a frame 171 so that the tray 170 can be shifted in a sheet discharging direction. A rotation link 173 is rotated around a shaft 174. The rotation link 173 is engaged by a groove 170a provided in a lower surface of the retractable tray 170 so that the retractable tray 170 is extended and retracted as mentioned above upon one revolution of the rotation link 173.

Incidentally, the rotation link 173 is driven by a motor M170 via a driving mechanism (not shown). A home position of the retractable tray 170 is set to the retracted position (as shown by the solid line in FIG. 5), and a sensor (not shown) for detecting such a position is provided.

Next, the stack tray 200 and a sample tray 201 will be explained with reference to FIGS. 8 and 9.

Two trays are used properly on demand; a lower tray, i.e., stack tray 200 is selected when copy output or printer output is received, and, an upper tray, i.e., sample tray 201 is selected when sample output, interruption output, output in stack tray overflow, function sorting output or job mixed-stacking output is received.

The two trays 200, 201 have respective motors 202 to be self-propelled independently in the upward and downward and are supported, via sub-rollers 214, by racks 210 (also act as sub-roller receivers) attached to a frame 250 of the sheet treating apparatus 1 in a vertical direction. Further, any frontward and rearward play of the tray is regulated by a regulating member 215. A tray motor (stepping motor) 202 is attached to a tray base plate 211, and a pulley secured by means of a press fit onto a motor shaft transmits a driving force of the tray motor to a pulley 203 through a timing belt 212.

A shaft 213 connected to the pulley 203 via parallel pins transmits a driving force to a ratchet 205 connected to the shaft 213 via parallel pins and is biased toward an idler gear 204 by a spring 206. The ratchet 205 is connected to the idler gear 204 to transmit the driving force to the idler gear 204, and the idler gear 204 is connected to a gear 207. The gear 207 transmits the driving force to the other gear 207 via a shaft 208 so that the driving force is transmitted to the racks 210 via gears 209 at the front and rear portions of the tray. With this arrangement, the trays can be shifted along the racks 210. Each tray is supported by the racks 210 via the sub-rollers 214 by containing two sub-rollers 214 within each rack 210 also acting as the sub-roller receiver 210. The trays 200, 201 are attached to the base plate 211 to constitute the tray unit.

In order to prevent the tray driving system from being damaged by entering foreign matters into the system during the lowering of the trays, the ratchet 205 is idly rotated against the force of the spring 206 only in a direction along which the trays are lifted. If such idle rotation occurs, a sensor S201 for stopping the driving of the motor immediately detects slits incorporated into the idler gear 204. The sensor S201 is normally used for detecting out-of-phase. Further, when the rocking guide 150 is in the closed condition, the rocking guide 150 forms a part of the stacking wall of the treating tray 130 having an opening portion so that the trays can shift across the treating tray 130 upward and downward, and, only when the closed position is detected by a sensor (not shown), the trays guide can be shifted.

A sensor S202 is an area detecting sensor for detecting a flag in an area from an upper limit sensor 203a for preventing over-lifting of the tray to a treating tray sheet surface detecting sensor S205. A sensor S203b for detecting a sample tray 1000 sheet position is spaced apart from a non-sort sheet surface detection sensor S204 by a distance corresponding to a thickness of 1000 sheets, thereby limiting the stacking amount of the sample tray on the basis of a height.

A sensor S203c serves to limit the stacking amount on the basis of a height when the sample tray 201 receives the sheets from the treating tray 130, and is spaced apart from a sheet surface detecting sensor S205 by a distance corresponding to a thickness of 1000 sheets. A sensor S203d serves to limit the stacking amount on the basis of a height when the stack tray 200 receives the sheets from the treating tray 130, and is spaced apart from the sheet surface detecting sensor S205 by a distance corresponding to a thickness of 2000 sheets. A sensor S203e is a lower limit sensor for preventing excessive lowering of the stack tray 200. Among these sensors, only the sheet surface detection sensors S204, S205 are frontward and rearward light permeable sensors. The respective trays are provided with sheet presence/absence detecting sensors 206.

As a method for detecting the sheet surface, a condition that the tray is lifted from below each sheet surface detecting sensor until the sheet surface detecting sensor is covered is used as an initial condition, and, after the sheets are stacked, the tray is lowered until an optical axis of the sheet surface detecting sensor is revealed and thereafter the tray is lifted until the optical axis of the sheet surface detecting sensor is covered again, and such operations are repeated.

Next, a flow of the sheet P will he described.

Figure 10:
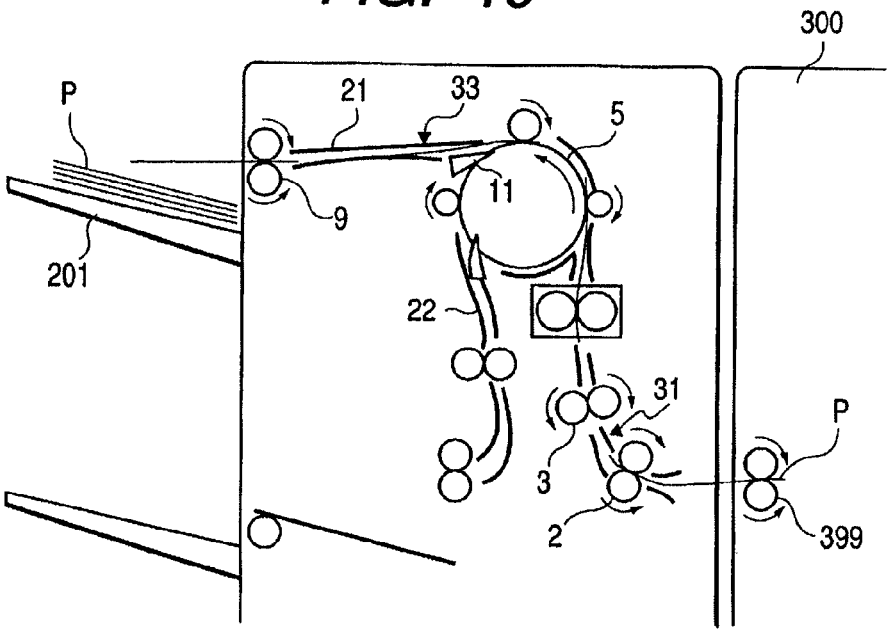
FIG. 10 is an elevational sectional view of the sheet treating apparatus in a non-sort mode.

When the operator designates a non-sort mode via an operation portion (not shown) of the image forming apparatus, as shown in FIG. 10, the pair of inlet rollers 2, the convey rollers 3 and the convey large roller 5 are rotated to convey the sheet P conveyed from the image forming apparatus 300. The flapper 11 is rotated to a position shown in FIG. 10 by a solenoid (not shown) to convey the sheet P into the non-sort path 21. When the trailing end of the sheet P is detected by the sensor 33, the roller 9 is rotated at a speed suitable for the stacking to discharge the sheet P onto the sample tray 201.

Next, a case where the operator designates a staple sort mode will be explained.

Figure 11:
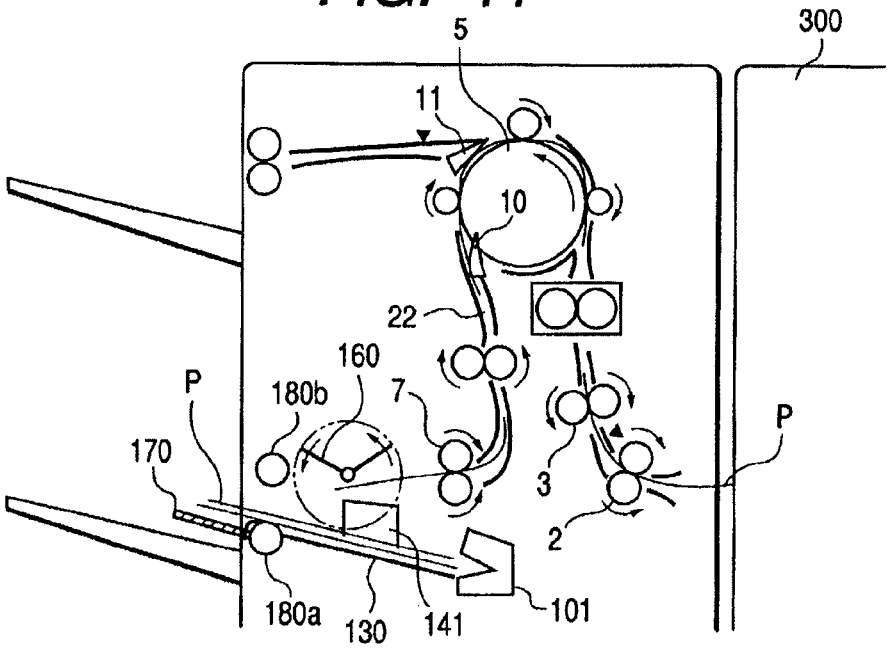
FIG. 11 is an operational view of the sheet treating apparatus in a staple sort mode.

As shown in FIG. 11, the pair of inlet rollers 2, the convey rollers 3 and the convey large roller 5 are rotated to convey the sheet P conveyed from the image forming apparatus 300. The flappers 10, 11 are stopped at positions shown in FIG. 11. The sheet P is passed through the sort path 22 and is discharged toward the stapler 101 by the pair of discharge rollers 7. In this case, since the retractable tray 170 is extended, when the sheet P is discharged by the pair of discharge rollers 7, the leading end of the sheet is prevented from being suspended to cause poor returning, and the aligning ability of the sheets on the treating tray 130 is improved.

The discharged sheet P starts to shift toward the trailing end stopper 131 by its own weight, and the paddle 160 which is stopped at the home position is rotated in the anti-clockwise direction by the motor M160 to aid the shifting of the sheet. The trailing end of the sheet P positively abuts against the stopper 131 and is stopped there. Then, the rotation of the paddle 160 is stopped, and the discharged sheet P is aligned by the aligning members 141, 142. The aligning operation for the sheet P will be described later.

Figure 12:
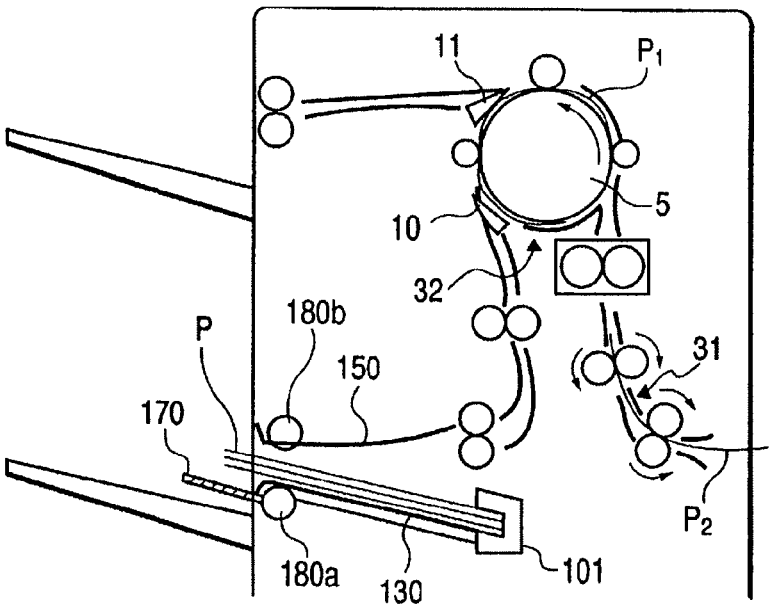
FIG. 12 is an operational view of the sheet treating apparatus in a staple sort mode.

After all of a first part of the sheets P are discharged on the treating tray 130 and are aligned with each other, as shown in FIG. 12, the rocking guide 150 is lowered to rest the bundle discharge upper roller 180b on the sheet bundle, and the sheet bundle is stapled by the stapler 101.

Figure 13:
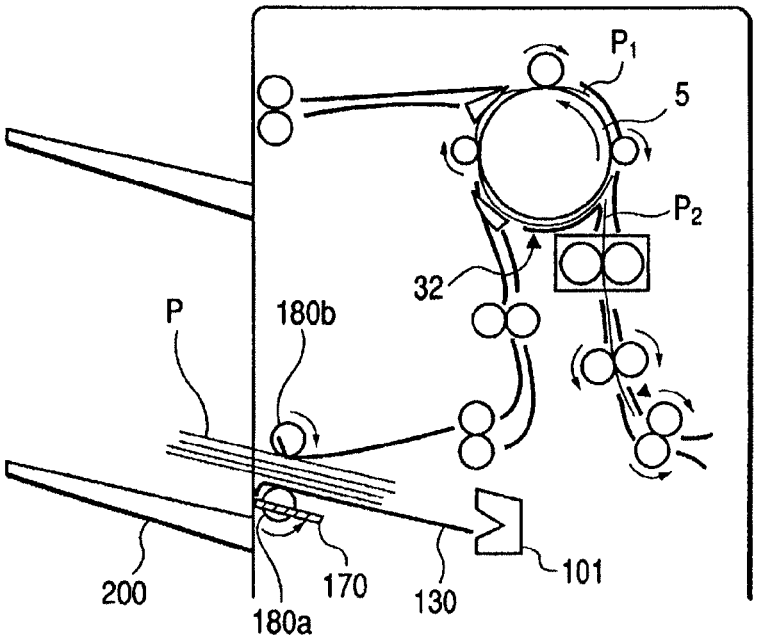
FIG. 13 is an operational view of the sheet treating apparatus in a staple sort mode.
Figure 14:
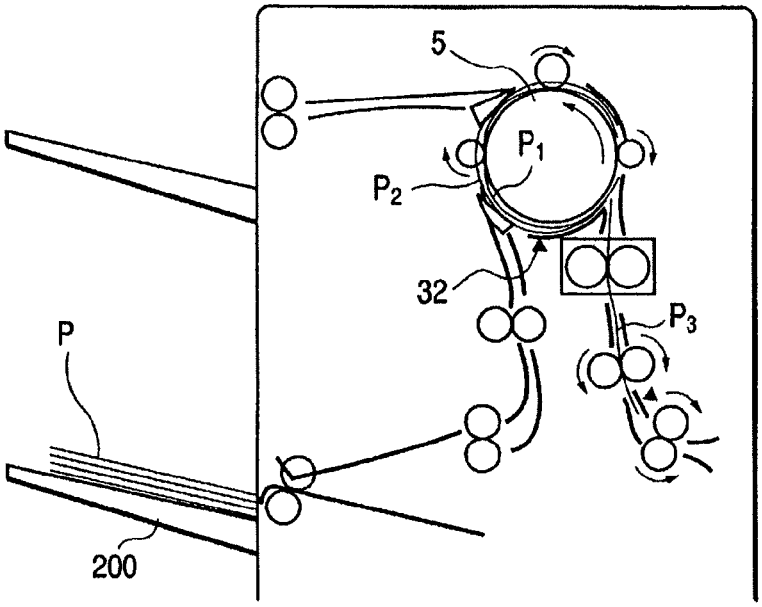
FIG. 14 is an operational view of the sheet treating apparatus in a staple sort mode.

Meanwhile, a sheet $P_1$ discharged from the image forming apparatus 300 is wound around the convey large roller 5 as a result of the rotation of the flapper 10 as shown in FIG. 12 and is stopped at a position advanced from the sensor 32 by a predetermined distance. When a next sheet $P_2$ advances from the sheet detecting sensor 31 by a predetermined distance, as shown in FIG. 13, the convey large roller 5 is rotated to overlap the first and second sheets $P_1$, $P_2$ in such a manner that the second sheet $P_2$ precedes the first sheet $P_1$ by a predetermined distance, and, as shown in FIG. 14, these sheets $P_1$, $P_2$ are wound around the convey large roller 5 and are stopped at a predetermined position. On the other hand, as shown in FIG. 14, the sheet bundle on the treating tray 130 is bundle-discharged onto the stack tray 200.

Figure 15:
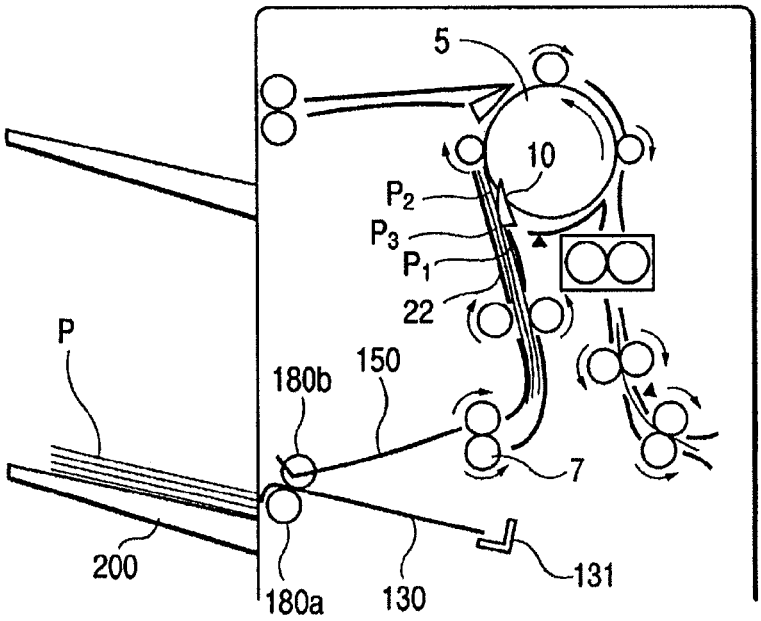
FIG. 15 is an operational view of the sheet treating apparatus in a staple sort mode.

However, in this case, the retractable tray 170 is shifted to the home position before the sheet bundle leaves the pair of bundle discharge rollers 180, in order to permit the dropping of the sheet bundle onto the stack tray 200. As shown in FIG. 15, when a third sheet $P_3$ reaches a predetermined position, the convey large roller 5 is rotated to be overlap the sheet $P_3$ with the sheets $P_1$, $P_2$ with predetermined deviation. Then, the flapper 10 is rotated to permit conveyance of three sheets P into the sort path 22.

Figure 16:
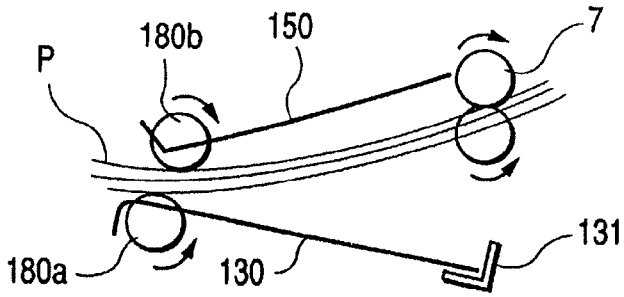
FIG. 16 is an operational view of the treating tray portion in the staple sort mode.
Figure 17:
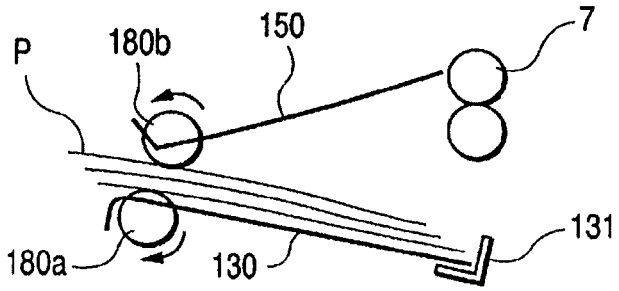
FIG. 17 is an operational view of the treating tray portion in the staple sort mode.
Figure 18A:
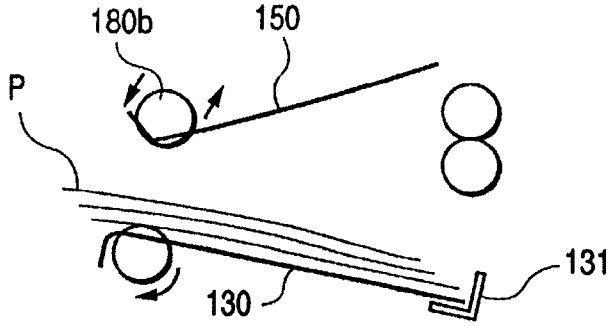
FIGS. 18A and 18B are operational views of the treating tray portion in the staple sort mode.
Figure 18B:
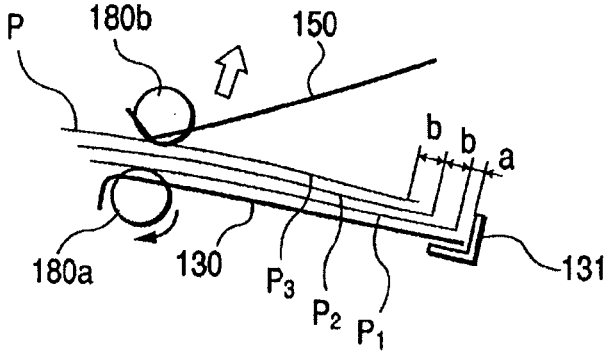

As shown in FIG. 16, the rocking guide 190 remains in the lowered position, and the three sheets P are received by the rollers 180a, 180b, and, as shown in FIG. 17, when the trailing end of the sheet bundle P leaves the roller pair 7, the rollers 180a, 180b are rotated reversely. And, before the trailing end of the sheet bundle abuts against the trailing end stopper 131, as shown in FIG. 18A, the rocking guide 150 is lifted to separate the bundle discharge upper roller 180b from the sheet surface. A fourth sheet $P_4$ and subsequent sheets are passed through the sort path 22 and are discharged onto the treating tray 130, as is in the first part sheets. Regarding a third part and subsequent parts, the same operation as the second part is effected. In this way, the set parts of sheet bundles are stacked on the stack tray 200, and the operation is finished.

In the conveyance of the plural overlapped sheets, each sheet is offset in the conveying direction; namely, the sheet $P_2$ is offset from the sheet $P_1$ toward the downstream direction, and the sheet $P_3$ is offset from the sheet $P_2$ toward the downstream direction.

An offset amount between the sheets P and a timing for lifting the rocking guide 150 associate with a sheet settling time due to the returning speed of the bundle discharge upper roller 180b, and, thus, are determined by the treating speed of the image forming apparatus 300. In the illustrated embodiment, when the sheet conveying speed is 750 mm/s, the offset amount b is about 20 mm and the returning speed of the bundle discharge upper roller 180b is 500 mm/s, the bundle discharge upper roller 180b is separated from the sheet at a timing approximately before the trailing end of the sheet $P_1$ reaches a position of about 40 mm (a) from the trailing end stopper 131.

Next, the sort mode will be explained.

Figure 19:
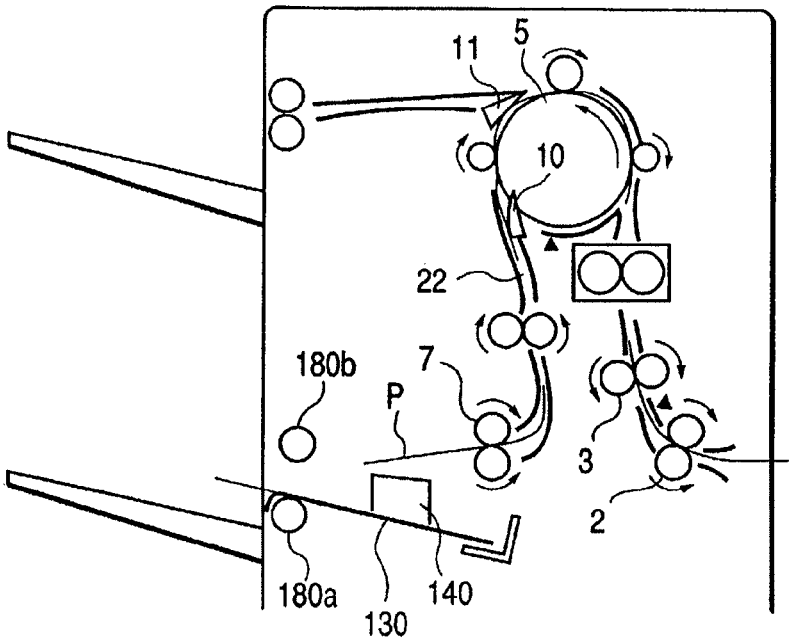
FIG. 19 is an operational view of the sheet treating apparatus in a sort mode.
Figure 20:
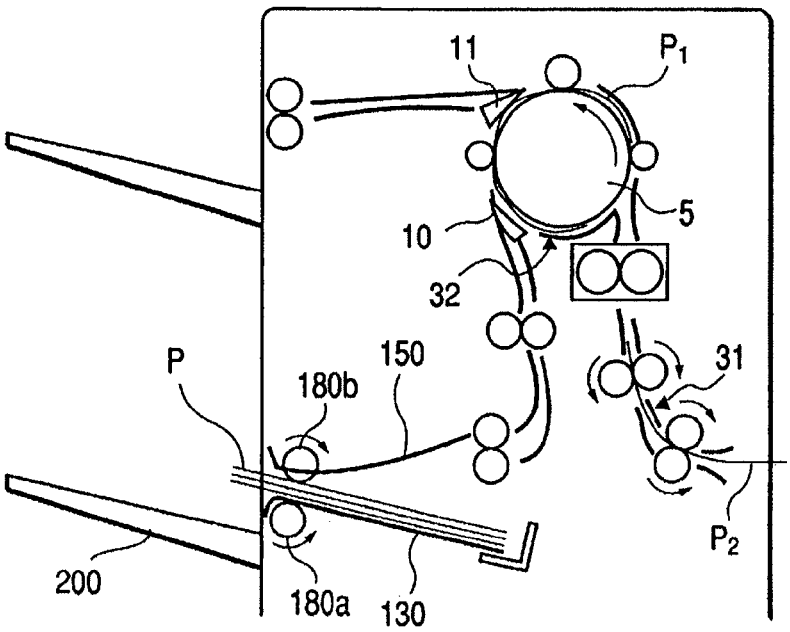
FIG. 20 is an operational view of the sheet treating apparatus in a sort mode.

The operator sets the originals in the RDF 500 and designates the sort mode via the operation portion (not shown) and turns the start key (not shown) ON. As is in the staple sort mode, the pair of inlet rollers 2 and the conveying rollers 3 are rotated to stack the sheets on the treating tray 130 as shown in FIG. 19. The aligning means 140 aligns the sheets P on the treating tray 130. After several number of sheets are stacked on the treating tray 130, as shown in FIG. 20, the rocking guide 150 is lowered to bundle-convey the several sheets.

Then, the conveyed sheet $P_1$ is passed over the flapper 10 and is wound around the large roller 5 as is in the staple sort mode. After the bundle-discharging is finished, the sheet $P_1$ is discharged onto the treating tray 130. It is desirable that the number of sheets to be bundle-discharged is smaller than twenty (20) from results of tests. The number of sheets are selected to satisfy the following relationship:

Original number≥bundle-discharged number≤20 Thus, in formation of program, if the number of sheets to be bundle-discharged is set to five (5), when the number of originals is four (4), every four sheets are bundle-discharged. If the number of originals is more than five (for example, fourteen (14)), regarding first five originals, five sheets are aligned and bundle-discharged, and then, regarding next five originals, five sheets are aligned and bundle-discharged, and then, regarding remaining four originals, four sheets are aligned and bundle-discharged.

When the bundle discharging for all of the first part of the sheets is finished, the front side aligning member 141 is shifted together with the rear side aligning member 142 to offset the alignment position for the second part with respect to the alignment position for the first part. The offsetting operation will be described later fully.

Figure 21:
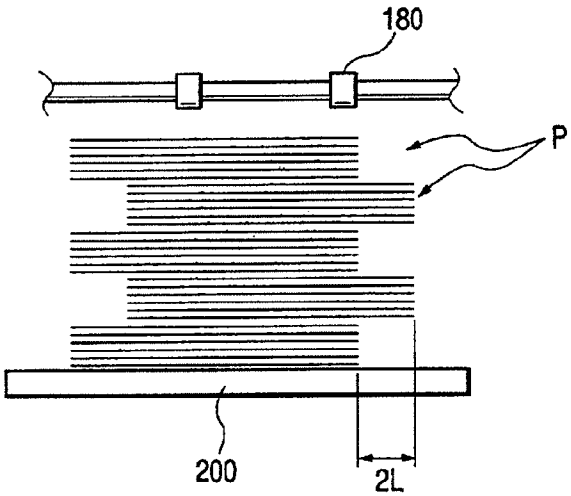
FIG. 21 is a view showing a stacking condition of a sheet bundle in the sort mode.

Regarding the second part, the sheets are aligned at the offset position, and every several sheets are bundle-discharged, as is in the first part. When the treatment of the second part is finished, the front side aligning member 141 and the rear side aligning member 142 are returned to the position where the first part of the sheets is aligned. At this position, the third part of the sheets is aligned. In this way, as shown in FIG. 21, the set parts are treated while the bundles are deviated from each other.

Now, the aligning operation will be explained.

Figure 22:
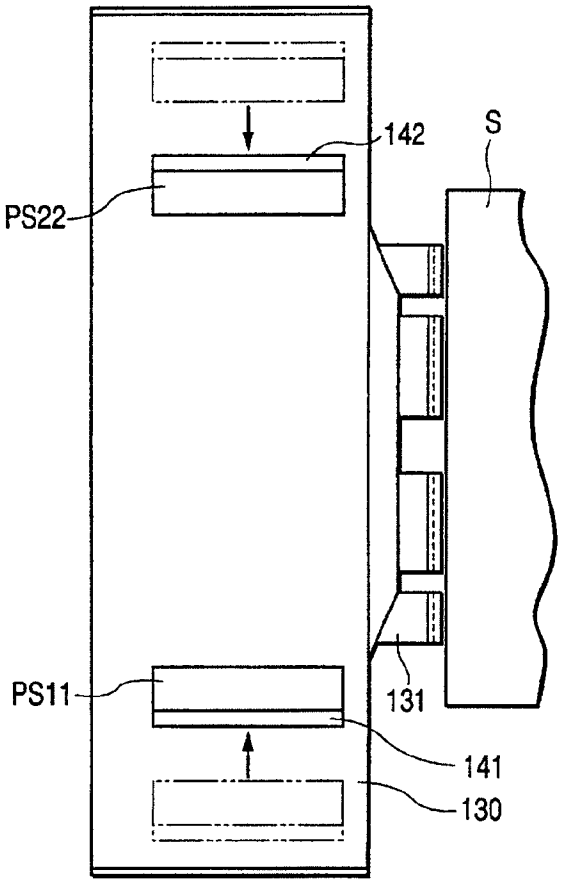
FIG. 22 is a plan view of the treating tray showing a sheet bundle aligning operation.

First of all, a case where a first bundle is aligned by shifting the sheets toward the rear side will be described. When there is no sheet on the treating tray 130, i.e., when the first sheet P is discharged in any job, the front side aligning member 141 which is waiting at the home position is previously shifted to a position PS11 slightly deviated from the width position of each sheet to be discharged, and the rear side aligning member 142 acting as the alignment reference is previously shifted to a reference position PS22 (FIG. 22).

Figure 23:
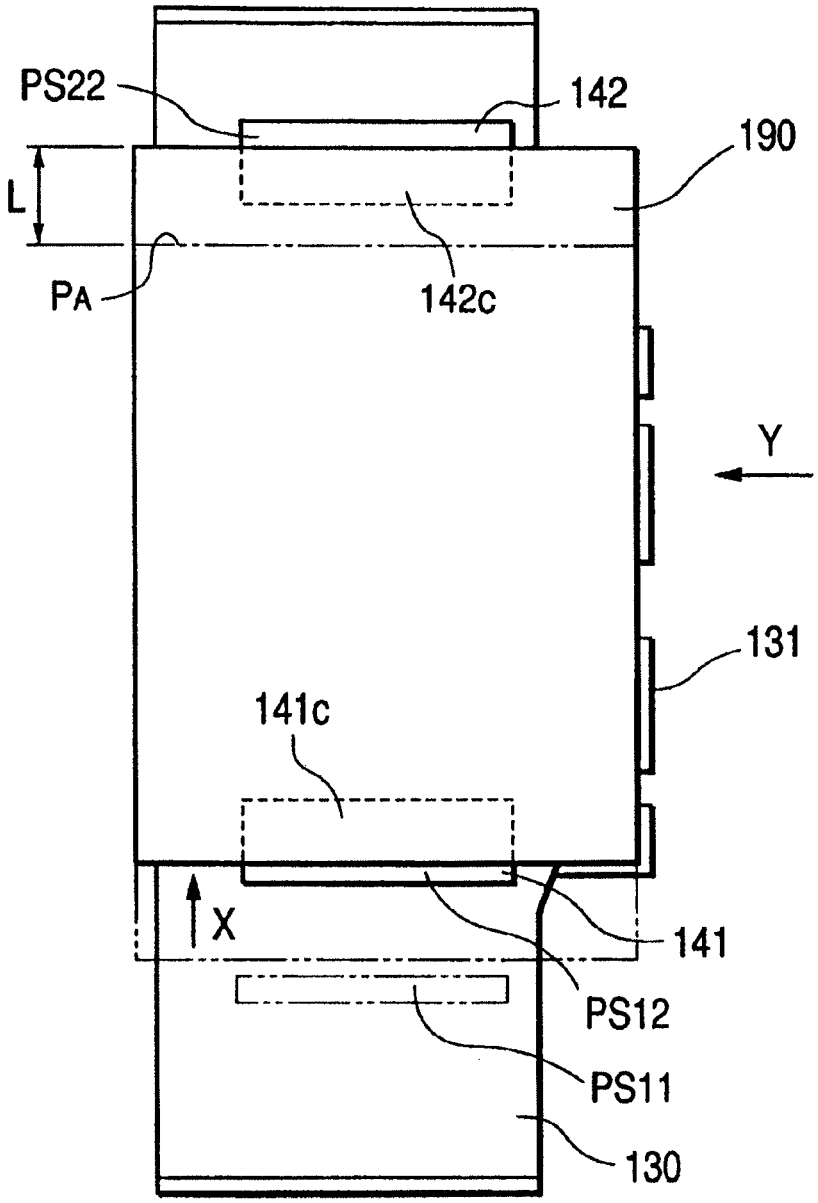
FIG. 23 is a plan view of the treating tray showing a sheet bundle aligning operation.

As mentioned above, when the trailing end of the sheet is supported by the trailing end stopper 131 and the lower surface of the sheet is supported by the support surfaces 141c, 142c of the aligning members, the front side aligning member 141 is shifted from the position PS11 to a position PS12 to shift the sheet to a first alignment position 190 (in the x direction), thereby urging the sheet against the rear side aligning member 142 to align the sheet (FIG. 23).

The first alignment position 190 is spaced apart rearwardly from a lateral edge PA of the sheet (discharged in a Y direction) in the sheet discharging onto the treating tray 130 by a predetermined amount L. Thereafter, the front side aligning member 141 is shifted to the position PS11 for preparing for the next sheet. When the next sheet discharging is finished, the front side aligning member 141 is shifted to the position PS12 again, thereby aligning the sheet at the first alignment position 190.

In this case, the rear side aligning member 142 continues to stop at the position PS22 to act as the reference as mentioned above. The above-mentioned operations are repeated up to the final sheet of such bundle.

The sheet bundle(s) for the first part aligned in this way is stapled if desired and is bundle-discharged onto the stack tray 200.

Then, sheets (three sheets as mentioned above) for the second part are discharged onto the treating tray 130. Now, movements of the aligning members 141, 142 in this case will be described.

The second part sheets are aligned by shifting the discharged sheets toward the front side. First of all, when first sheets P (three sheets) are discharged in any job, the front side aligning member 141 is previously shifted to a position PS13 as a reference of the second alignment position, and the rear side aligning member 142 is previously shifted to a position PS21 slightly deviated from the width position of each sheet to be discharged.

Figure 24:
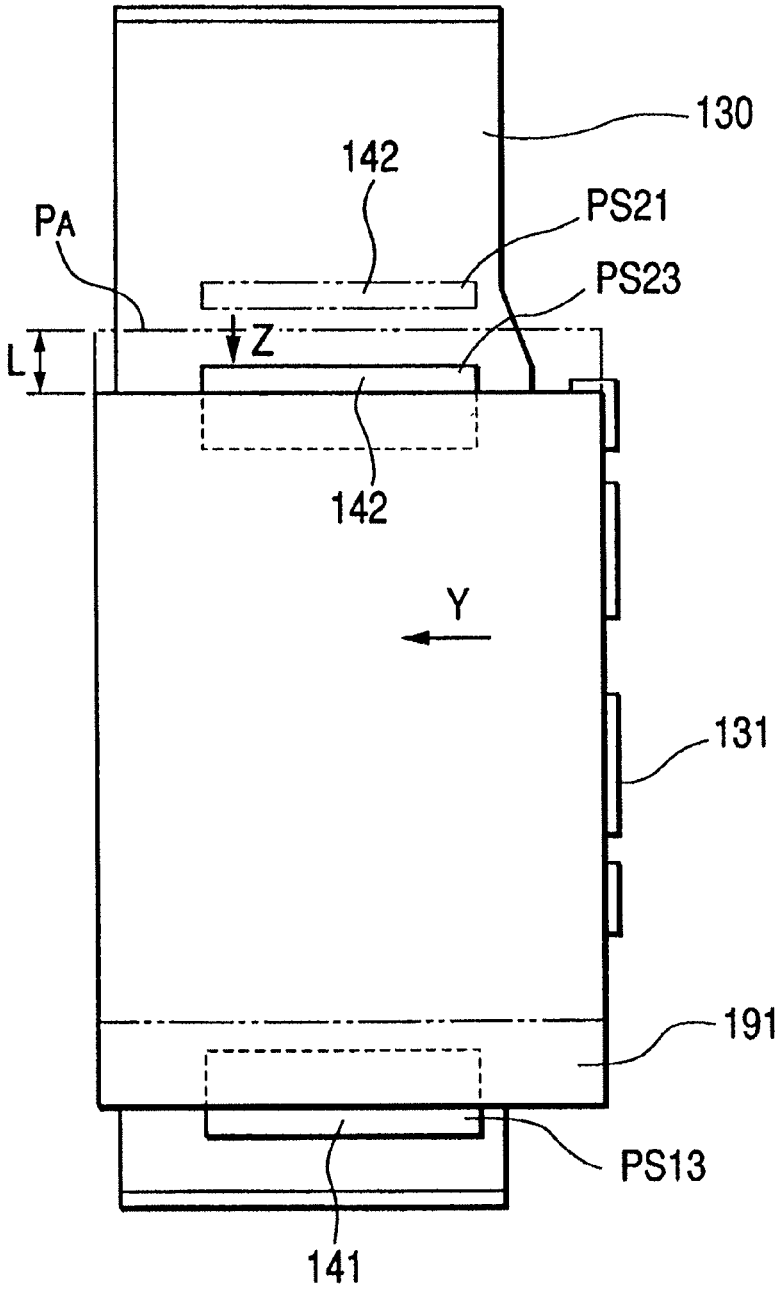
FIG. 24 is a plan view of the treating tray showing a sheet bundle aligning operation.

Similar to the above, the sheets (three sheets) discharged on the treating tray 130 are shifted from the position PS21 to the position PS23 by the rear side aligning member 142 to shift the sheets to a second alignment position 191 (in a Z direction), thereby urging the sheets against the front side aligning member 141 to align the sheets (FIG. 24). Thereafter, similar to the above, in a condition that the front side aligning member 141 is kept stationary, the above-mentioned operations are repeated up to the final sheet of such bundle.

The second alignment position 191 is spaced apart forwardly from the lateral edge PA of the sheet (discharged in a Y direction) in the sheet discharging onto the treating tray 130 by a predetermined amount L.

In this way, the sheet bundles are stacked on the stack tray 200 while changing the alignment position for each sheet bundle, so that the sorted stacking having the offset amount 2L (=L+L) can be performed.

In the illustrated embodiment, while the example that the sheet alignment position for the first sheet bundle is deviated rearwardly with respect to the sheet discharging position is explained, the first sheet bundle may be treated at the front side position and the second sheet bundle may be treated at the rear side position and the subsequent sheet bundles may be treated at the front side position and the rear side position alternatively to achieve the same effect. Further while the example that the front and rear sheet shifting amounts with respect to the sheet discharging position are set to the same distance L is explained, the front sheet shifting amount may be different from the rear sheet shifting amount.

The offset amount 2L may be varied between the sort mode and the staple mode. For example, in the staple mode, the offset amount may be selected to an amount 2L (about 15 mm) to prevent the overlapping of the staples of the adjacent sheet bundles after the stacking, and, in the sort mode, the offset amount may be selected to an amount 2LA (about 20 to 30 mm) to improve discriminating ability between the bundles. In this way, the alignment shifting distance in the staple mode can be reduced, thereby improving the treating speed.

As mentioned above, since the sheets are shifted forwardly and rearwardly by the distance L with respect to the sheet discharging position on the treating tray 130 for every sheet bundle, for example, the shifting amount in the sheet alignment can be reduced in comparison with the case where the offset is attained by changing the shifting amount for every bundle by shifting the sheet only in one direction (rearwardly or forwardly) with respect to the sheet discharging position.

Figure 25:
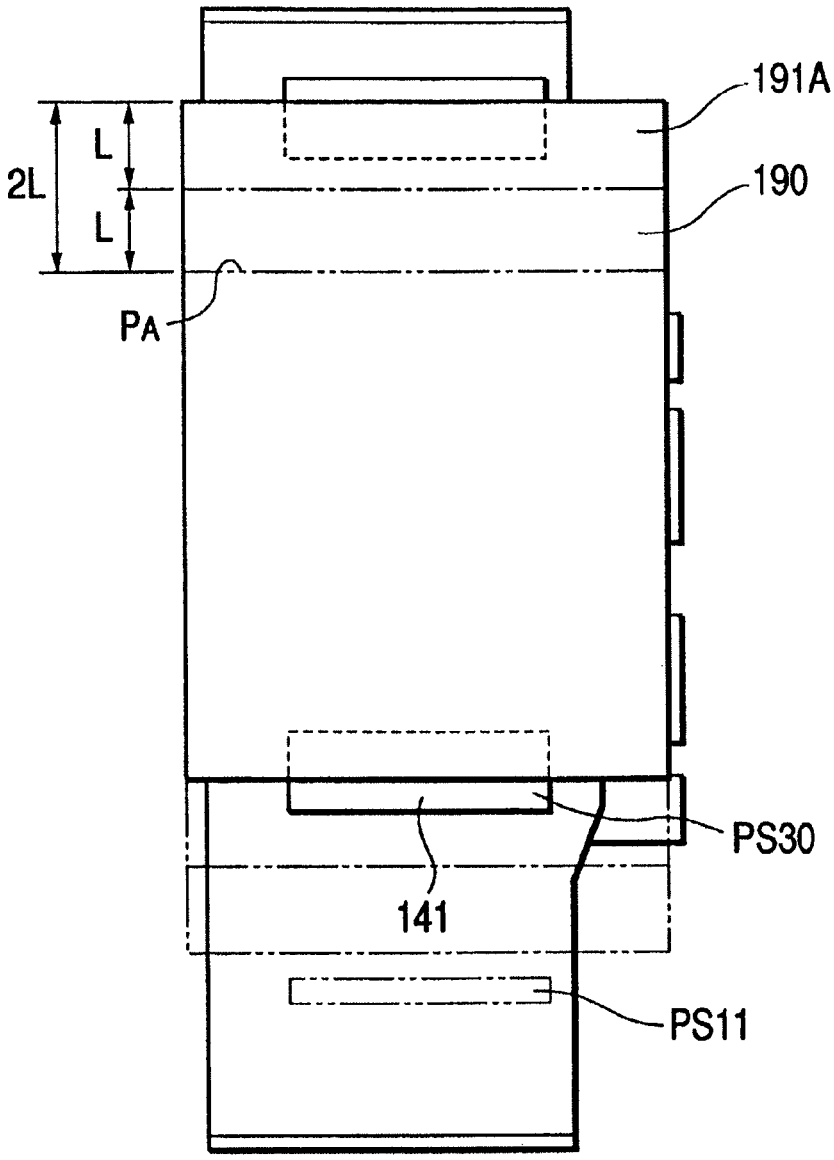
FIG. 25 is a plan view of the treating tray showing a sheet bundle aligning operation when the sheet bundle is offset at one side with respect to a sheet discharging position.

A reason why the shifting amount of the aligning members can be reduced will be explained with reference to FIG. 25.

As mentioned above, in the case where the sheet bundles try to be offset respectively by the total amount 2L by shifting the sheets rearwardly by the predetermined amount L with respect to the lateral edge PA of the sheet in the sheet discharging position (shifting to the first alignment position 190 (FIG. 23)) and by further shifting the second alignment position rearwardly by the predetermined amount L with respect to the lateral edge PA of the sheet in the sheet discharging position (shifting the second alignment position to a position 191A (FIG. 25)), the front side aligning member 141 must be shifted by the great distance 2L or more from the retracted position PS11 to the position PS30 for each sheet discharging.

As mentioned above, according to the arrangement of the illustrated embodiment, since, even when the shifting amount of the aligning members 141, 142 is minimized, the maximum offset amount required for alignment for each sheet bundle can be ensured, the motors for shifting the aligning members can be made compact, and the present invention can be applied to a high speed image forming apparatus in which a time period between the sheets discharged continuously is small.

Further, since the alignment positions of the aligning members 141, 142 for aligning the sheet bundle discharged on the treating tray 130 by the pair of discharge rollers 7 are shifted and offset for each sheet bundle, the stack tray 200 receiving the sheet bundle from the treating tray 130 does not need to effect the offsetting operation. Accordingly, it is not required that the stack tray 200 on which a large number of sheets are stacked be shifted in the offset direction, thereby preventing the end(s) of the sheet(s) from being damaged and/or folded due to rubbing, and, thus, maintaining high quality of the discharged sheets.

Further, since a motor for shifting the large capacity stack tray 200 is not required, the entire apparatus can be made more compact.

Figure 8:
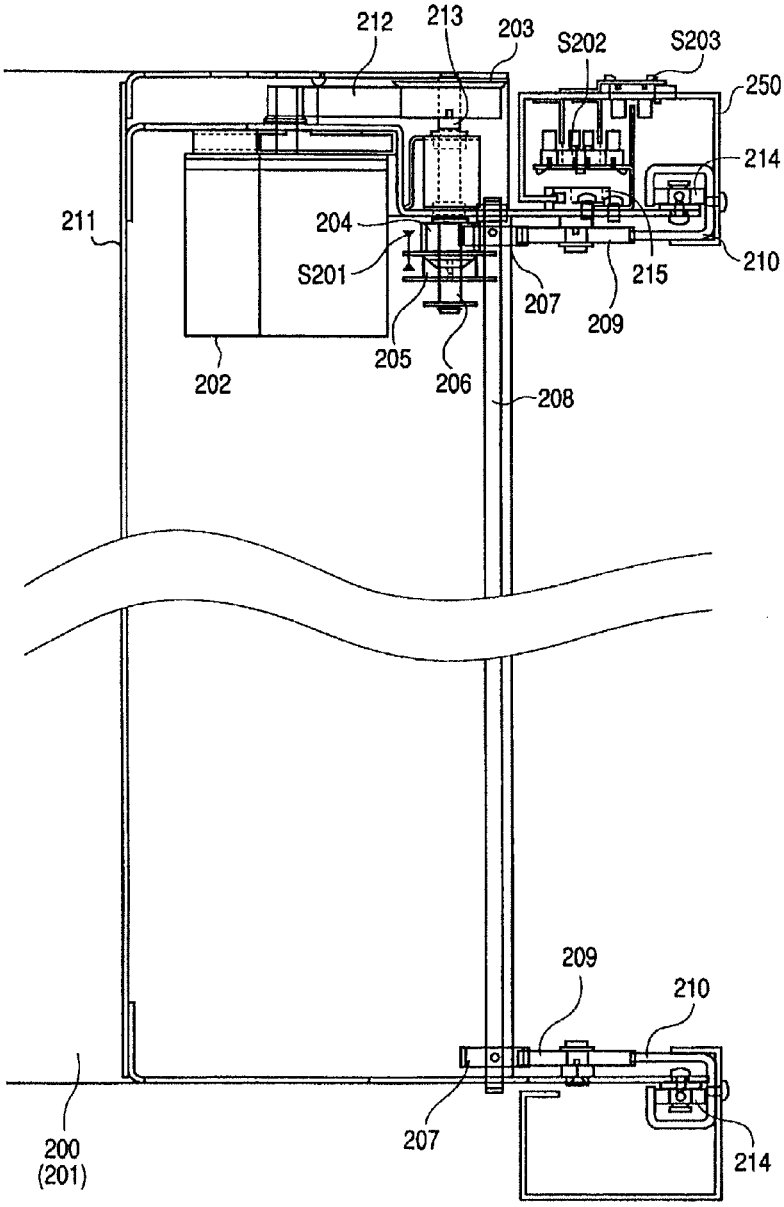
FIG. 8 is a plan view of a tray shifting mechanism.
Figure 9:
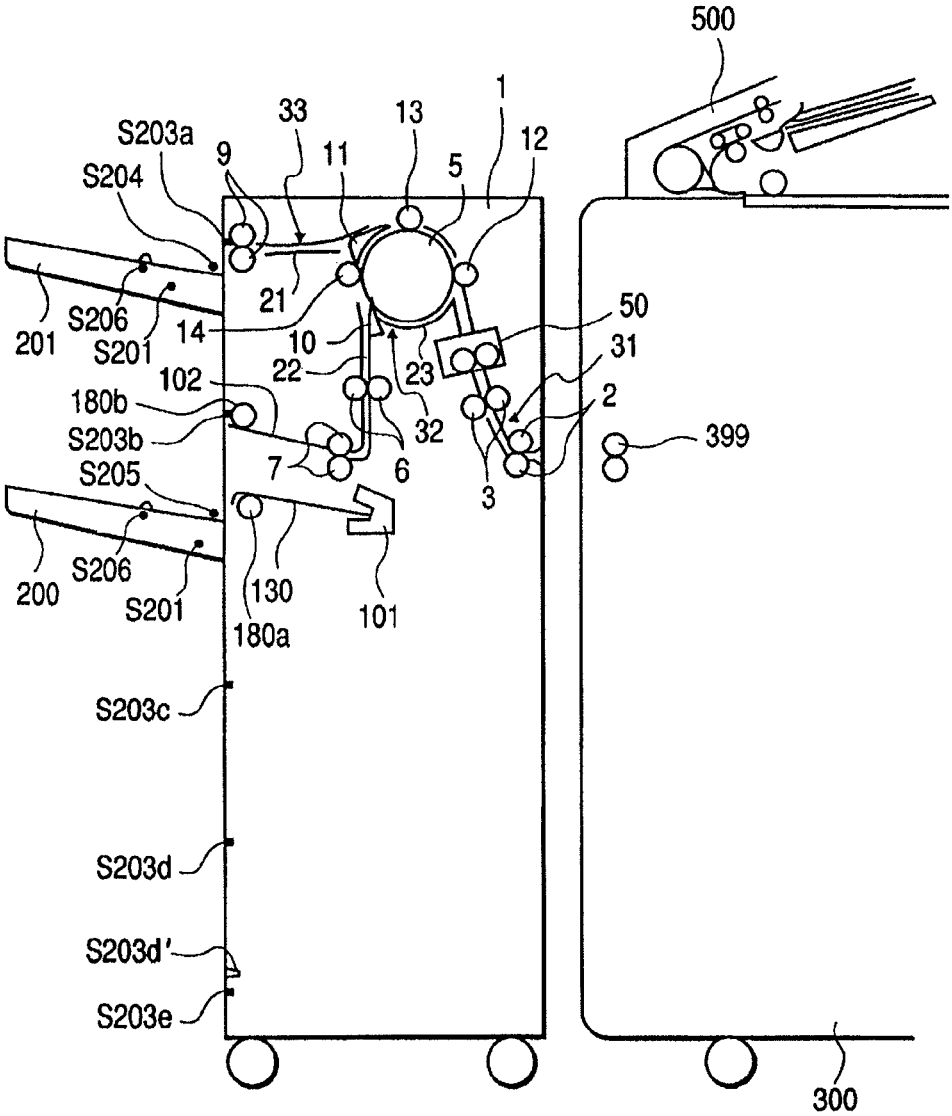
FIG. 9 is a view showing arrangement of sensors around a sample tray and a stack tray.

Next, movements of the stack tray 200 and the sample tray 201 will be explained (FIGS. 8 and 9). Before an operation, these trays are normally waiting at the sheet surface detecting sensor positions.

From the above explanation, the stack tray 200 normally serves to stack thereon copies or outputs from the printer and can receive the sheet bundle treated by the stapler 101 or the non-stapled sheet bundle comprised of several sheets. Sheet bundles in which the total number of sheets is 2000 at the maximum can be stacked on the stack tray, and the sensor S203d detects the maximum stacking amount.

In this case, if the copies or the printer outputs further continue, the stack tray 200 is lowered from the sensor S203d position by a distance corresponding to a thickness of 1000 sheets (sensor S203d' position). Then, the sample tray 201 is lowered to the position of the sheet surface detecting sensor S205 for the treating tray, and receipt of the sheets is restarted. In this case, the sample tray 201 can receive sheet bundles in which the total number of sheets is 1000 at the maximum, and the sensor S203c detects the maximum stacking amount.

After the job including 2000 sheets or less is finished, when the next job is started without removing the sheets on the stack tray 200 or when interruption is executed during the present job, although the treating operation cannot be performed, by using the sample tray 201, the sheets can be received from the non-sort path 21.

In the normal condition, when only one sample part is outputted without treatment or when the sample tray output is set as the function sorting, the sheets are outputted to the sample tray 201 through the non-sort path 21.

What is claimed is:

1. A sheet treating apparatus including:

sheet discharging means for discharging a sheet;

first stacking means for receiving the sheets discharged by said sheet discharging means;

aligning means for aligning *the discharged sheets to be made into* a sheet bundle on said first stacking means by a pinching movement effected by first and second aligning members shiftable independently in a *sheet width-wise* direction perpendicular to a sheet discharging direction;

*stapling means shiftable along an end of the sheet bundle in said sheet width-wise direction and configured to staple the sheet bundle aligned by the aligning means on said first stacking means;* a plurality of driving means for driving said first and second aligning members independently;

controlling means for controlling said driving means; and transferring means for transferring the sheet bundle on said first stacking means to [a] second stacking means, wherein a first sheet bundle is aligned by using a first reference position obtained by shifting one of said first and second aligning members by a predetermined amount with respect to a lateral edge of the discharged sheet, and then a second sheet bundle is aligned by using a second reference position obtained by shifting the other aligning member by a predetermined amount with respect to a lateral edge of the discharged sheet, thereby the first sheet bundle and the second sheet bundle are made offset relative to each other, and such sheet bundle aligning operations are effected alternately for successive sheet bundles*, and*

*said controlling means is adapted to control said stapling device so that said stapling device is moved to respective positions corresponding to said first and second alignment positions to perform a stapling operation.*

2. A sheet treating apparatus according to claim 1, wherein, whenever several sheets in each sheet bundle are stacked on said first stacking means, said transferring means transfers the several sheets to said second stacking means.

3. A sheet treating apparatus according to claim 1, wherein, whenever all of the sheets in each sheet bundle are stacked on said first stacking means, said transferring means transfers said sheet bundle to said second stacking means.

4. A sheet treating apparatus according to claim 3, [further including stapling means, and] wherein each sheet bundle is stapled by said stapling means before the sheet bundle is transferred.

5. A sheet treating apparatus according to claim 1, wherein said second stacking means is disposed at a downstream side of said first stacking means and is liftable and lowerable.

6. A sheet treating apparatus according to claim 5, wherein said transferring means feeds out the sheet bundle on said first stacking means while nipping the sheet bundle between upper and lower rotary members.

[7. A sheet treating apparatus according to claim 6, further including stapling means for stapling the sheet bundle on said first stacking means, and wherein said stapling means is shiftable along the end of the sheet in a sheet width-wise direction perpendicular to the sheet discharging direction.]

8. A sheet treating apparatus according to claim [7] *1*, wherein the sheet bundle offset amount in a non-stapling mode is greater than the sheet bundle offset amount in a stapling mode.

9. A sheet treating apparatus according to claim 1, wherein said aligning means is operated every one sheet discharged.

10. A sheet treating apparatus according to claim 1, wherein said sheet treating apparatus has a first mode in which, whenever several sheets in each sheet bundle are stacked on said first stacking means, said transferring means transfers the several sheets to said second stacking means, and a second mode in which, whenever all of the sheets in each sheet bundle are stacked on said first stacking means, said transferring means transfers said sheet bundle to said second stacking means.

11. A sheet treating apparatus according to claim 10, [further including stapling means, and] wherein, in said second mode, each sheet bundle is stapled by said stapling means before the sheet bundle is transferred.

12. A sheet treating apparatus according to claim 11, wherein the sheet bundle offset amount in said first mode is greater than the sheet bundle offset amount in said second mode.

13. A sheet treating apparatus according to claim 1, wherein said respective aligning members have a rack and a pinion, so that rotation of a motor is converted into a linear movement.

14. An image forming apparatus including:

a sheet treating apparatus according to any one of claims 1 to *6 or 8 to* 13;

image forming means for forming an image on the sheet; and discharging means for discharging the sheet on which the image is formed by said image forming means to said sheet treating apparatus.

* * * * *